(12) United States Patent
Hattori

(10) Patent No.: US 7,128,966 B2
(45) Date of Patent: *Oct. 31, 2006

(54) ANTIREFLECTION FILM AND METHOD FOR MANUFACTURING THE SAME

(75) Inventor: Hideshi Hattori, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/018,718

(22) PCT Filed: Apr. 16, 2001

(86) PCT No.: PCT/JP01/03247

§ 371 (c)(1),
(2), (4) Date: Dec. 14, 2001

(87) PCT Pub. No.: WO01/79894

PCT Pub. Date: Oct. 25, 2001

(65) Prior Publication Data

US 2002/0160166 A1 Oct. 31, 2002

(30) Foreign Application Priority Data

Apr. 17, 2000 (JP) ............... 2000-115270
Oct. 18, 2000 (JP) ............... 2000-317590

(51) Int. Cl.
*B32B 5/16* (2006.01)

(52) U.S. Cl. ............... 428/323; 428/301.4; 428/300.7; 428/195.1; 428/212; 428/206; 428/407; 359/620; 359/580; 359/601; 359/619; 349/137; 430/7

(58) Field of Classification Search ............... 428/212, 428/206, 323, 407, 301.4, 300.7, 195.1; 359/580, 359/661, 620, 601, 619; 349/137; 430/7
See application file for complete search history.

(56) References Cited

U.S. PATENT DOCUMENTS

| | | | |
|---|---|---|---|
| 3,485,658 A | | 12/1969 | Iler |
| 4,957,816 A | * | 9/1990 | Adkins ............... 428/411.1 |
| 5,744,243 A | * | 4/1998 | Li et al. ............... 428/447 |
| 5,843,332 A | * | 12/1998 | Takeuchi et al. ....... 252/299.01 |
| 5,880,557 A | * | 3/1999 | Endo et al. ............... 313/461 |
| 5,919,555 A | * | 7/1999 | Yasuda et al. ............... 428/206 |
| 5,976,680 A | * | 11/1999 | Ikemori et al. ............... 428/212 |
| 6,106,948 A | * | 8/2000 | Wang et al. ............... 428/413 |
| 6,187,522 B1 | * | 2/2001 | Majumdar et al. ....... 430/527 |
| 6,210,787 B1 | * | 4/2001 | Goto et al. ............... 428/301.4 |
| 6,383,620 B1 | * | 5/2002 | Aoyama et al. ............... 428/212 |
| 6,551,701 B1 | * | 4/2003 | Nohr et al. ............... 428/323 |
| 6,773,801 B1 | * | 8/2004 | Hattori ............... 428/323 |

FOREIGN PATENT DOCUMENTS

| | | |
|---|---|---|
| JP | 5290634 | 11/1993 |
| JP | 7168004 | 7/1995 |
| JP | 9222503 | 8/1997 |
| JP | 09222503 | * 8/1997 |
| JP | 2000276941 | 10/2000 |

OTHER PUBLICATIONS

Katsuhiko Ariga, Yuri Lvov, Mitsuhiko Onda, Izumi Ichinose and Toyoki Kunitake, Alternately Assembled Ultrathin Film of Silica Nanoparticles and Linear Polycations, Chemistry Letters, Chemical Society of Japan, 1997, No. 2, pp. 125 and 126.

Takeshi Serizawa, Hiroko Takeshita, and Mitsuru Akashi, Electric Adsorption of Pollystyrene Nanospheres onto the Surface of an Ultrathin Polymer Film Prepared by Using an Alternate Adsorption Technique, Langmuir, American Chemical Society, Apr. 1998, vol. 14, pp. 4088 and 4089.

* cited by examiner

*Primary Examiner*—Rena Dye
*Assistant Examiner*—Tamra L. Dicus
(74) *Attorney, Agent, or Firm*—Ladas & Parry LLP

(57) ABSTRACT

An objective of the present invention is to provide an antireflection film having a fine particle layer that is formed on a transparent substrate without allowing particles to aggregate as irregular lumps, while the region having no particles is being reduced to an area that is sufficiently small so as not to impair the visibility. In order to achieve the above-mentioned objective, the present invention provides an antireflection film that is characterized by having: a transparent substrate and a fine particle layer that is placed on the surface of the transparent substrate and made from at least a single layer of fine particles, wherein the surface of the transparent substrate and fine particles are allowed to adhere to each other by at least an electrostatic interaction, while the bulk of the above-mentioned fine particle layer is set to have a refractive index lower than the refractive index of the above-mentioned transparent substrate.

9 Claims, 13 Drawing Sheets

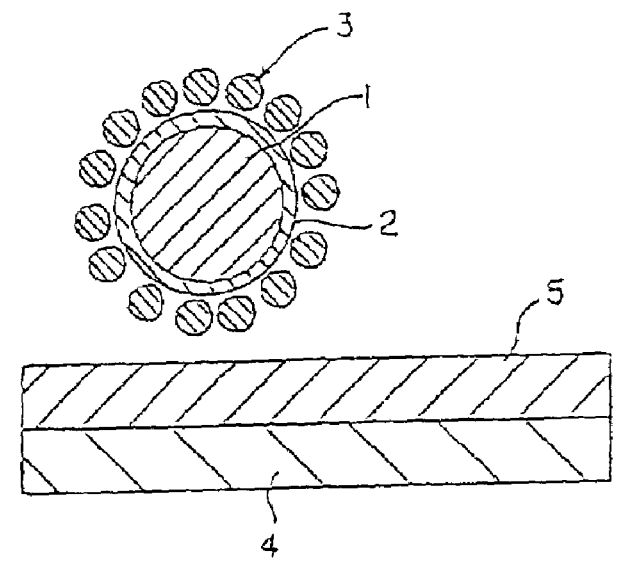
FIG.1A
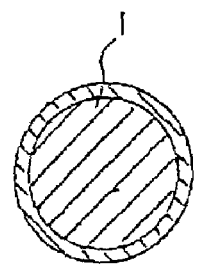
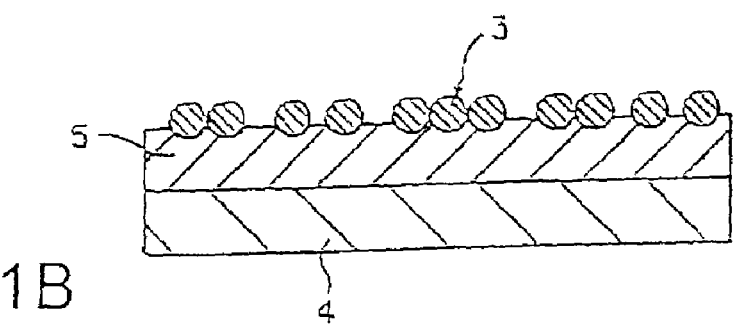
FIG.1B
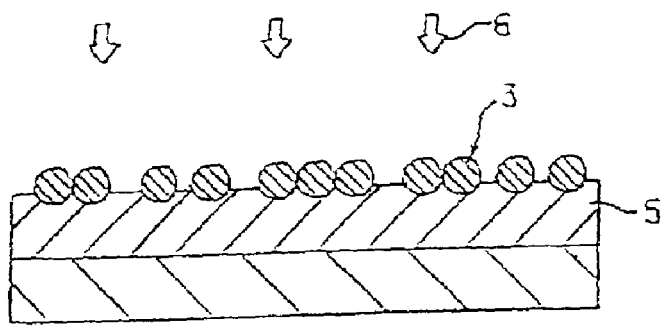
FIG.1C

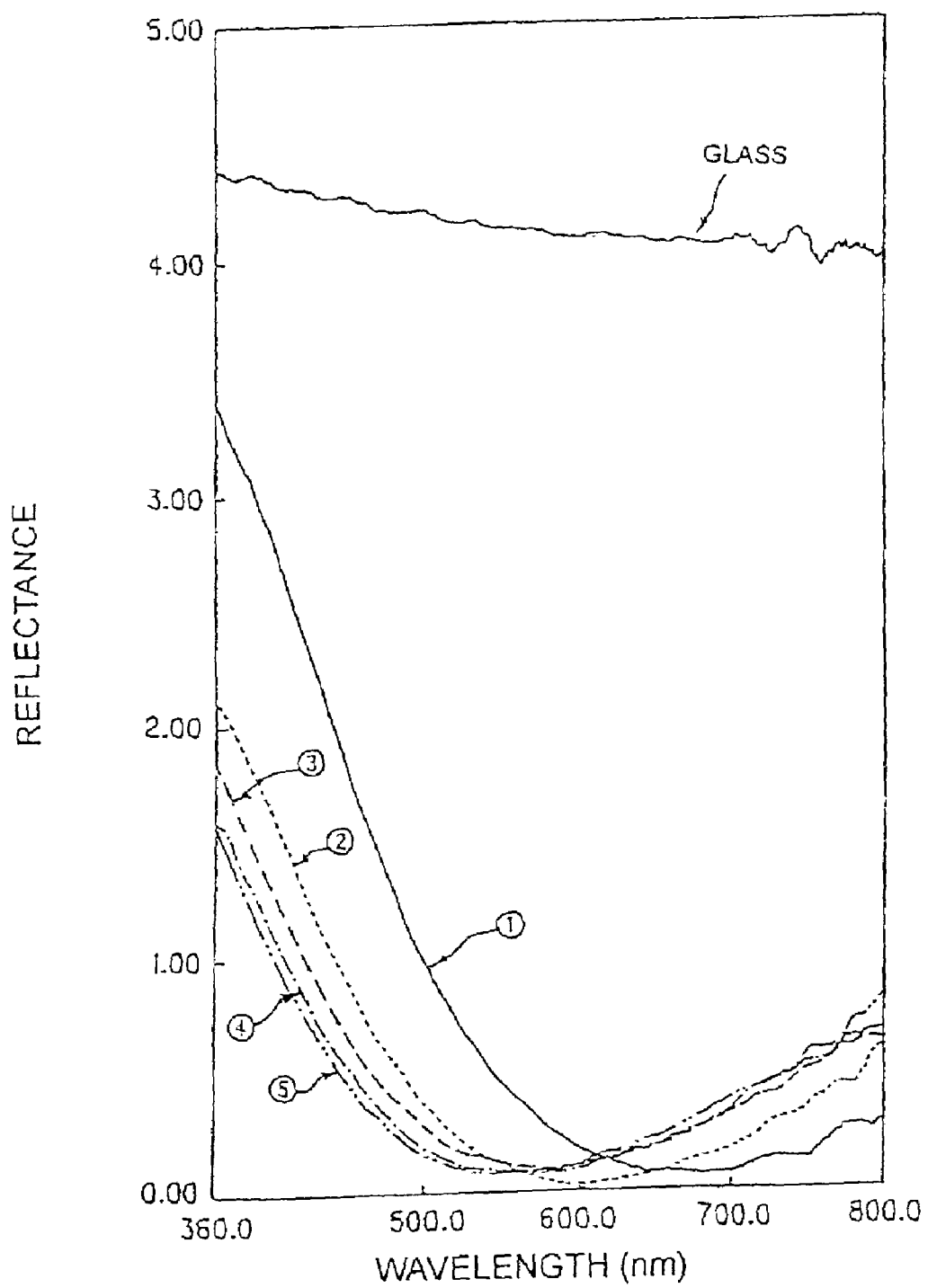

ANTIREFLECTION FILM AND METHOD FOR MANUFACTURING THE SAME

TECHNICAL FIELD

The present invention relates to an antireflection film which is applicable to displays for personal-use and commercial-use, such as televisions, personal computers, word processors, mobile telephones and mobile information terminals by using systems such as CRTs (cathode ray tubes), LCDs (liquid crystal displays), plasma display and electroluminescence, as well as to solar batteries, lenses, window glass in buildings, window glass for vehicles, curve mirrors, back mirrors and goggles, so as to improve the visibility, efficiency, etc. of these products, and also concerns a manufacturing method for such an antireflection film.

BACKGROUND ART

With respect to a conventional manufacturing method for antireflection films, a method in which desired numbers of low refractive-index layers and high refractive-index layers are formed on a substrate with their thickness being controlled is widely used. However, this method generally requires a vacuum equipment, thereby failing to provide a method with high cost performance. For this reason, various structures without requiring a vacuum equipment or with less number of layers have been proposed.

Among these methods, with respect to a method for using a ultra-low-refractive-index layer in which holes and air voids are introduced therein as the low-refractive-index layer so as to greatly improve the antireflection property, for example, in one proposed method, a fine particle layer with voids being located between the particles is formed on the substrate by using a coating method. This method provides a low-reflectance achieved by continuous changes in the refractive index obtained by the surface shaping effect of fine particles, the low-reflectance being also achieved by bulk (the layer thickness specified by the particle size) refractive-index reduction (average refractive-index reduction) by utilizing the voids between particles (where the refractive-index of voids is 1); thus, it is possible to obtain an antireflection film having high performances by using a simple manufacturing method.

Examples of such a method include a coat film filled most closely with fine particles and a manufacturing method thereof (Japanese Patent Application Laid-Open No. 7-198904), a coat film with fine particles being dispersed and held in one layer by utilizing a binder layer having a thickness smaller than the particle size (Japanese Patent Application Laid-Open No. 5-42211), a coat film having a layer of substrate on which porous fine particles are formed (Japanese Patent Application Laid-Open No. 5-13021), and an antireflection film having a structure in which a binder section of a film formed by ultra-fine particles that are dispersed and held as one layer by a binder is removed by a dry etching process and voids are introduced between particles, and a manufacturing method thereof (Japanese Patent Application Laid-Open No. 7-104103), etc.

Moreover, an antireflection film which is allowed to have similar functions as the above-mentioned particle layers by providing fine irregularities on a coat layer has been proposed. Examples thereof include: an antireflection film in which fine irregularities are formed by etching a layer composed of ultra-fine particles and a binder and a manufacturing method thereof (Japanese Patent No. 2858821), and an antireflection film (Ullrich Steiner, et. al. Science, volume 283, page 520, 1999) made by a method in which fine air voids and holes are formed in a polymer blend thin-film by its micro phase separation and solvent extraction of specific components from the polymer, etc.

The above-mentioned various methods are all based upon simple processes as their concept, and have respective problems. In other words, first, with respect to the various methods for forming one particle layer, the process for forming one particle layer on a substrate is carried out by a coating method that is typically represented by a slide coating method, or a dip coating method. In the coating method typically represented by a slide coating method, it is very difficult to provide a uniform coating operation without allowing particles to aggregate as irregular lumps, while the region having no particles is being reduced to an area that is sufficiently small so as not to impair the visibility, and another problem is that the coating rate is not raised so high.

Here, the dip coating method also has similar problems, and in particular, with respect to the coating speed (the substrate raising speed), this needs to be set to as small as several tens μ msec$^{-1}$ in order to obtain a uniform particle most-closely filled structure (Nagayama, et al. Langmuir, vol 12, page 1303, 1999; Japanese Patent No. 2905712); therefore, this makes the method very difficult to be put into practical use from the industrial point of view.

DISCLOSURE OF INVENTION

The present invention, which has been devised to solve the above-mentioned problems, provides an antireflection film having a fine particle layer that is formed without allowing fine particles to coagulate on a transparent substrate as irregular lumps while the region having no particles is set to a sufficiently small size so as not to impair the visibility, by positively utilizing electrostatic interactions between the substrate surface and a fine particle surface in a suspension, or the fine particle surface in an emulsion or a latex, and also provides a manufacturing method for such an antireflection film; thus, on principle, the present invention makes it possible to greatly improve the firm-forming rate in the fine particle layer as compared with the conventional method, and its main objective is to provide a process for producing an antireflection film with a superior manufacturing efficiency.

In order to achieve the above-mentioned objective, the present invention provides an antireflection film which includes a transparent substrate and a fine particle layer that is placed on the surface of the above-mentioned transparent substrate and made from at least a single layer of fine particles, with the above-mentioned transparent substrate surface and fine particles adhering to each other by at least an electrostatic interaction, while the bulk of the above-mentioned fine particle layer is set to have a refractive-index lower than the refractive-index of the above-mentioned transparent substrate.

In the present invention, fine particles are placed on the surface of the transparent substrate through the electrostatic interaction between the surface of the transparent substrate and the fine particles to form a fine particle surface; therefore, the transparent substrate is simply coated with the fine particles by dipping it in a fine particle dispersant such as a comparatively concentrated fine particle suspension, emulsion or latex, and then the particles that have not adhered to the transparent substrate through the electrostatic interaction are simply cleaned and removed to form the fine particle layer; thus, it is possible to provide an antireflection film by utilizing a low reflectance property achieved by a refractive-index reduction of the bulk (the entire fine particle layer formed by fine particles, etc.) formed by utilizing air voids between fine particles in the fine particle layer (where the refractive-index is 1 when air exists in the voids), and it is also possible to provide an antireflection film with superior performances through simple processes.

In the present invention, the adhesion between the surface of the transparent substrate and the fine particles through the electrostatic interaction is preferably achieved by forming a polymer electrolyte film made of a polymer electrolyte on the surface of the transparent substrate and using fine particles having a polarity different from the polarity that the polymer electrolyte film has.

In order to allow the surface of the transparent substrate and the fine particles by the electrostatic interaction, it is necessary to apply a polarity different from that of the fine particles, that is, either the positive or negative polarity, to the surface of the transparent substrate. In this case, if either the positive or negative charge density on the surface of the transparent substrate is high, it is possible to form a fine particle layer in which fine particles uniformly adhere onto the transparent substrate, and consequently to provide a high quality antireflection film. Moreover, in the polymer electrolyte, it is possible to desirably select its anionic property, cationic property and its density and balance so that the charge on the fine particle surface is not limited to either one of the anionic and cationic properties. For these reasons, it is desirable to form a polymer electrolyte film made of a polymer electrolyte on the surface of the transparent substrate and to use fine particles having a polarity different from the polarity that the polymer electrolyte film has.

In this case, the above-mentioned polymer electrolyte film is preferably provided as a multi-layered film that is formed by sequential deposition not less than two kinds of polymer electrolytes that have mutually different polarities. This arrangement is made to prevent the fine particles within the fine particle layer from forming unnecessary multi-layered films and to provide a uniform polymer electrolyte film with a high surface charge density.

In the above-mentioned invention, it is preferable to provide the polymer electrolyte film as a film made of a cross-linked polymer electrolyte. This arrangement is also made to prevent the fine particles within the fine particle layer from forming unnecessary multi-layered films and to provide a uniform polymer electrolyte film with a high surface charge density.

The above-mentioned antireflection film is more preferably arranged so that in addition to the adhesion through the above-mentioned electrostatic interaction, the adhesion between the above-mentioned transparent substrate surface and the fine particles is further made by a reinforcing adhesive means.

Only the electrostatic interaction sometimes fails to provide a sufficient adhesive strength of fine particles to the surface of the transparent substrate, resulting in a problem with an abrasive resistant property as an antireflection film. Therefore, in addition to the electrostatic interaction, the fine particles are allowed to adhere to the surface of the transparent substrate by the reinforcing adhesive means so that the fine particles are allowed to adhere to the surface of the transparent substrate more firmly, thereby forming an antireflection film with a superior abrasion resistant property.

In this case, the above-mentioned reinforcing adhesive means is at least one means preferably selected from the group consisting of a means for irreversibly coupling the surface of the transparent substrate and the fine particles chemically, a means for fusing the surface of the transparent substrate and the fine particles and a means for forming a polymer thin film on the surface of the fine particle layer. By using each of these reinforcing adhesive means or by using these in combination, it is possible to provide an antireflection film with a superior abrasion resistant property.

Moreover, the present invention is provided with at least a transparent substrate, and a fine particle layer placed on the surface of the transparent substrate, having fine particles formed at least as a single layer, and having a bulk refractive-index that is lower than the refractive-index of the transparent substrate, and in this arrangement, the above-mentioned fine particle layer is a fine particle layer that is formed by allowing fine particles to adhere to the substrate surface through an electrostatic interaction between the substrate surface and the fine particles, on another substrate surface, and the antireflection film is formed by allowing this fine particle layer to be transferred on the transparent substrate.

In this manner, the fine particle layer in the antireflection film of the present invention is formed on another substrate through an electrostatic interaction, and this is transferred on a transparent substrate; thus, it becomes possible to use a substrate having a positive or negative charge repeatedly, and consequently to reduce the costs.

In this case, the adhesion between said another substrate surface and the fine particles through the electrostatic interaction is carried out by forming a polymer electrolyte film made of a polymer electrolyte, and using fine particles having a polarity that is different from the polarity that this polymer electrolyte film has.

For the same reasons as the aforementioned case, this arrangement makes it possible to form a fine particle layer in which fine particles are allowed to uniformly adhere to a substrate, and also to provide an antireflection film with high quality by transferring this particle layer; moreover, since the charge on the surface of the fine particles is not limited to either the anion or cation, it is possible to provide a wider range of material selection.

At this time, the above-mentioned polymer electrolyte film is preferably prepared as a multi-layered film formed by sequential deposition not less than two kinds of polymer electrolytes having mutually different polarities. This arrangement is made to prevent the fine particles within the fine particle layer from forming unnecessary multi-layered films and to provide a uniform polymer electrolyte film with a high surface charge density.

In the above-mentioned invention, it is preferable to provide the polymer electrolyte film as a film made of a cross-linked polymer electrolyte. This arrangement makes it possible to prevent the fine particles within the fine particle layer from forming unnecessary multi-layered films and to provide a uniform polymer electrolyte film with a high surface charge density. This arrangement also makes it possible to prevent damages to the polymer electrolyte film at the time of the transferring process of the fine particle layer, to improve the transferring durability of the polymer electrolyte film formed on the substrate, and to increase the number of possible transferring operations; thus, it becomes possible to provide an antireflection film at low costs.

Moreover, in the above-mentioned antireflection film, the adhesion between the fine particles of the above-mentioned fine particle layer and the above-mentioned transparent substrate surface is carried out by using at least one adhesive means preferably selected from the group consisting of a means for irreversibly coupling the surface of the transparent substrate and the fine particles chemically, a means for fusing the surface of the transparent substrate and the fine particles, a means for forming a polymer thin film on the surface of the fine particle layer and a means for forming an adhesive layer on the surface of the transparent substrate and for allowing the fine particles to adhere to the adhesive layer. This makes it possible to increase the adhesive strength of the fine particles onto the transparent substrate, and consequently to improve the abrasion resisting property of the antireflection film.

In the above-mentioned antireflection film, it is preferable to set the film thickness of the fine particle layer in the range of 50 nm to 300 nm. The above-mentioned range makes it possible to improve the antireflection effect of the fine particle layer within the visible light range.

Moreover, in the above-mentioned antireflection film, fine particles used for the fine particle layer are at least not less than one kind of fine particles preferably selected from the group consisting of fine particles of polymers and silica fine particles, and the average particle size thereof is preferably set in the range of 50 nm to 300 nm. The average particle size smaller than the above-mentioned range might cause the film thickness of the fine particle layer to become too thin, failing to provide a sufficient antireflection effect. Moreover, the average particle size exceeding the above-mentioned range might allow the single particle film to reflect incident visible light in scattered and diffused manner, thereby reducing the transmittance of visible light.

Here, in the above-mentioned antireflection film, the above-mentioned fine particle layer is preferably formed by at least two layers, with the film thickness of one layer being set in a range of 50 nm to 300 nm and the film thickness of the other layer being set in a range 1 nm to 50 nm. This arrangement makes it possible to adjust the film thickness of the entire fine particle layer, and consequently to shift the wavelength having the highest antireflection effect to be located at the position that exerts the most effective antireflection effect.

Moreover, in the above-mentioned antireflection film, the volume percentage of the fine particles in the fine particle layer is preferably set in the range of 10 volume % to 90 volume %. The volume percentage smaller than the above-mentioned range fails to allow the fine particle layer to be optically recognized as a layer, thereby failing to exert an antireflection effect. Furthermore, the volume percentage greater than the above-mentioned range causes a reduction in the gap between the fine particles, thereby failing to exert the typical effect of the present invention in which the bulk refractive-index of the fine particle layer is reduced by the above-mentioned gap so as to improve the antireflection effect.

Moreover, in the above-mentioned antireflection film, the bulk refractive-index of the fine particle layer is preferably set in the range of 1.05 to 1.70. Fine particles are filled in the fine particle layer so that the bulk refractive-index is set within the above-mentioned range; thus, it is possible to maximize the antireflection effect of the resulting antireflection film.

The present invention provides a process for producing an antireflection film characterized by including: a charge applying process for applying a charge on the surface of the transparent substrate, a fine particle layer forming process for applying to the transparent substrate a fine particle dispersant containing fine particles having a surface charge the polarity of which is reversed to the charge applied to the surface of the transparent substrate to form a fine particle layer, and a cleaning process for cleaning the transparent substrate on which the fine particle layer is formed.

In this manner, the formation of the fine particle layer onto the transparent substrate is carried out by applying the fine particle dispersant containing fine particles and then cleaning the resulting substrate; therefore, the manufacturing process is simple and effective. Therefore, it becomes possible to manufacture an antireflection film at reduced costs.

In this case, for the same reason as described above, the charge applying process for applying a charge to the surface of the transparent substrate is preferably prepared as a process for forming on the surface of the transparent substrate a polymer electrolyte film made of a multi-layered film formed by sequential deposition at least not less than two kinds of polymer electrolytes having mutually different polarities and/or a polymer electrolyte film made of a cross-linked polymer electrolyte.

Moreover, the present invention provides a process for producing an antireflection film characterized by including: a charge applying process for applying a charge on a substrate surface, a fine particle layer forming process for applying to the transparent substrate a fine particle dispersant containing fine particles having a surface charge the polarity of which is reversed to the charge applied to the substrate surface to form a fine particle layer, a cleaning process for cleaning the substrate on which the fine particle layer is formed, and a transferring process for transferring the fine particle layer formed on the substrate onto the transparent substrate.

In this manner, a fine particle layer is once formed on the substrate, and this is then transferred onto the transparent substrate so as to form an antireflection film; thus, this process eliminates the necessity of carrying out a charge applying process for applying a charge only on the substrate surface and also carrying out a charge applying process on the transparent substrate by repeatedly using this substrate. Therefore, since it is not necessary to carry out a charge applying process such as a formation of a polymer electrolyte film for each transparent substrate, the process can be simplified, and it is possible to form an antireflection film with reduced costs.

In this case, in the above-mentioned transferring process, the adhesive means between the fine particles in the above-mentioned fine particle layer and the above-mentioned transparent substrate surface is preferably prepared as at least one means selected from the group consisting of a means for irreversibly coupling the surface of the transparent substrate and the fine particles chemically, a means for fusing the surface of the transparent substrate and the fine particles, a means for forming a polymer thin film on the surface of the fine particle layer and a means for forming an adhesive layer on the surface of the transparent substrate and for allowing the fine particles to adhere to the adhesive layer. This makes it possible to improve the abrasion resisting property of the resulting antireflection film.

Moreover, the present invention provides a process for producing an antireflection film characterized by including: a charge applying process for applying a charge on a substrate surface, a fine particle layer forming process for applying to the transparent substrate a fine particle dispersant containing fine particles having a surface charge the polarity of which is reversed to the charge applied to the substrate surface to form a fine particle layer, a cleaning process for cleaning the substrate on which the fine particle layer is formed, a printing plate forming process for forming a printing plate by molding a printing plate material using the fine particle layer on the transparent substrate cleaned in the cleaning process as an original plate, and a fine particle duplicate layer forming process for forming a fine particle duplicate layer on the transparent substrate by using the printing plate manufactured through the printing plate forming process. In this manner, the printing plate is manufactured, and an antireflection film is duplicated by using this; thus, the conventional manufacturing processes of a lens film and a light diffusion film, as they are, can be used. Therefore, it is possible to reduce the initial investment, and consequently to reduce the costs of the resulting antireflection film.

In the process for producing the antireflection film of the present invention, the charge applying process for applying a charge to the substrate surface is preferably prepared as a process for forming on the substrate surface a polymer electrolyte film made of a multi-layered film formed by sequential deposition at least not less than two kinds of polymer electrolytes having mutually different polarities and/or a polymer electrolyte film made of a cross-linked polymer electrolyte.

BRIEF DESCRIPTION OF DRAWINGS

FIG. 1 is an explanatory drawing that shows one example of an adhesive means in a second Preferred Embodiment of the present invention.

FIG. 8 is a graph that shows the reflectance (incident angle 5°) of a sample obtained by Preferred Embodiment 7.

BEST MODE FOR CARRYING OUT THE INVENTION

Figure 2A:
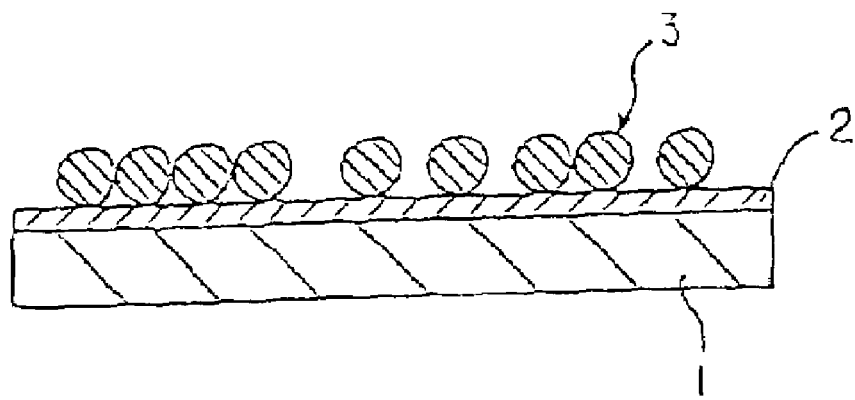
FIG. 2 is an explanatory drawing that shows one example of a printing plate manufacturing process in a manufacturing method of a third Preferred Embodiment of the present invention.

The inventors of the present invention have found that a known phenomenon in which, by an electrostatic interaction between a charge on the surface of a substrate and a charge on the fine particle surface in a dilute fine particle suspension, fine particles are adsorbed to, bonded to or allowed to adhere to the substrate surface, is applied to a process for producing an antireflection film, and that the film formation is carried out at high speeds by examining the film-forming conditions of the fine particle film formed by allowing the fine particles to adhere to the substrate surface, and consequently have devised the present invention. The following description will discuss such an antireflection film in accordance with the present invention in detail.

The antireflection film of the present invention is divided into a first preferred mode in which it is formed by directly applying a fine particle layer on a transparent substrate and a second preferred mode in which a fine particle layer is once formed on another substrate, and it is formed by transferring this fine particle layer on the transparent substrate. The following description will discuss each of the preferred modes in detail.

1. First Preferred Embodiment

An antireflection film in accordance with the first Preferred Embodiment of the present invention is provided with a transparent substrate, and at least a fine particle layer having fine particles formed into a single layer, and characterized in that the surface of the transparent substrate and the fine particles are allowed to adhere to each other by at least an electrostatic interaction, and in that the bulk refractive index of the fine particle layer is lower than the refractive index of the transparent substrate.

This feature of the present Preferred Embodiment lies in that the fine particles are placed on the surface of the transparent substrate by the electrostatic interaction between the surface of the transparent substrate and the fine particles so as to form a fine particle layer. Since the present preferred Embodiment has such a feature that a transparent substrate may be simply coated with a comparatively concentrated fine particle suspension, emulsion or a fine particle dispersant such as a latex through various coating methods as described later, and the particles that have not adhered to the transparent substrate through the electrostatic interaction are then cleaned and removed so that it is possible to form a uniform fine particle layer. Therefore, the uniform coating process of fine particles onto a transparent substrate, which has been impossible to carry out by the conventionally proposed antireflection film manufacturing methods, may be carried out, thereby making it possible to provide an antireflection film with high quality. Moreover, in the present Preferred Embodiment, it is possible to carry out the coating of the fine particle dispersant onto the transparent substrate by using, for example, a dip coat method in a short time. Therefore, in comparison with the conventional method for manufacturing an antireflection film by using fine particles, it is possible to manufacture in a shorter time, and also to reduce the costs of the finally obtained antireflection film. Moreover, in the present Preferred Embodiment, by using, for example, a dip coating method, etc., it is possible to form an antireflection film not only on a plane, but also on a curved face, an inner face of a cylinder shaped structure, or on the surface of a complex shaped structure.

The following description will discuss the antireflection film of the first Preferred Embodiment, with respect to each structure in a separated manner.

(Transparent Substrate)

With respect to the transparent substrate used in the present Preferred Embodiment, any transparent substrate that is transparent in the visible light range and that is normally used as an antireflection film may be used. Specific examples of the material include resins, glass, metal, ceramics, etc., and with respect to the shape, any transparent substrate having a film shape, a sheet shape and a plate shape, in addition to a shape having a curved face, a cylinder shape or a complex shape, may be used.

With respect to the resin substrate, examples thereof include: triacetyl cellulose, diacetyl cellulose, acetate butyrate cellulose, polyether sulfone, polyacrylic resins, polyurethane resins, polyester, polycarbonate, polysulfone, polyether, trimethyl pentene, polyether ketone, (meth)acrylonitrile, etc.

With respect to the transparent substrate used in the present Preferred Embodiment, those members using PET, glass, etc. as materials are generally used.

(Fine Particles)

With respect to the fine particles used in the present Preferred Embodiment, not particularly limited, any fine particles that are transparent fine particles in the visible light range and that provide a refractive index that is smaller than the refractive index of the transparent substrate as the bulk refractive index at the time when a fine particle layer, which will be described later, is formed may be used.

Examples of specific fine particles of inorganic materials include: fine particles of $MgF_2$ (refractive index: 1.38), $SiO_2$ (refractive index: 1.46), $AlF_3$ (refractive index: 1.33 to 1.39), $CaF_2$ (refractive index: 1.44), LiF (refractive index: 1.36 to 1.37), NaF (refractive index: 1.32 to 1.34), and $ThF_4$ (refractive index: 1.45 to 1.5), etc.

Moreover, with respect to fine particles of organic materials, fine particles of polymers are listed, and specific examples include: cross-linked acrylic fine particles (for example, MX series and MR series made by Soken Chemical (K.K.)), non-cross-linked acrylic fine particles (for example, MP series made by Soken Chemical (K.K.)), cross-linked polystyrene fine particles (for example, SGP series made by Soken Chemical (K.K.)), non-cross-linked polystyrene fine particles, highly cross-linked monodispersed polymethyl methacrylate fine particles (for example, MS series and M series made by Soken Chemical (K.K.)), composite fine particles of these and functional-group introduced fine particles of these.

In the present Preferred Embodiment, among the above-mentioned fine particle materials, silica ($SiO_2$) fine particles or fine particles of polymers are preferably used.

With respect to the average particle size of fine particles used in the present Preferred Embodiment, those in the range of not less than 50 nm to not more than 300 nm are preferably used, and those in the range of not less than 70 nm to not more than 250 nm are more preferably used. The average particle size smaller than the above-mentioned range is not preferable, since the film thickness of the fine particle layer becomes too thin and might fail to provide a sufficient antireflection effect, when fine particles are formed into a fine particle layer as a single layer. Moreover, the average particle size exceeding the above-mentioned range is not preferable, since the fine particle layer, provided as a single layer, reflects incident visible lights in scattered and diffused manners, and reduces the visible light transmittance. Here, this phenomenon is particularly remarkable when observed diagonally. In other words, in the case when fine particles exceeding the above-mentioned range is used, the resulting antireflection film has a low transmittance and a high angle dependence, generally resulting in a failure in forming an antireflection film.

Moreover, the particle size distribution of fine particles to be used is not particularly limited, and it is preferable to use those having a comparatively small particle size distribution. More specifically, the particle size distribution exceeding 300 nm in particle size is not included; in other words, the particle size distribution is preferably set at not less than 300 mn.

Furthermore, the refractive index of the above-mentioned fine particles is not particularly limited as long as the refractive index of the fine particle layer is smaller than the refractive index of the transparent substrate when a fine particle layer, which will be described later, is formed; however, those having a small refractive index are preferably used. With respect to the preferable refractive index of fine particles, it is set within the range of 1.05 to 1.70, in particular, within the range of 1.05 to 1.55.

In the present invention, it is possible to use conductive fine particles as the fine particles since a static eliminating effect is also achieved in addition to the antireflection effect. These conductive fine particles may be used solely, or may be used in combination with fine particles having a low refractive index such as $SiO_2$.

With respect to such conductive fine particles, not particularly limited as long as the fine particles have a certain degree of conductivity, examples thereof include: tin oxide ($SnO_2$), antimony-doped tin oxide, phosphor doped tin oxide, zinc oxide (ZnO), indium oxide ($In_2O_3$) and tin doped indium oxide, etc.

With respect to the average particle size of fine particles in the case when such conductive fine particles are used, from the viewpoint of the static eliminating property, it is preferably set in the range from not less than 1 nm to less than 50 nm, more preferably, in the range from not less than 1 nm to less than 35 nm, most preferably, in the range from not less than 1 nm to less than 30 nm. Moreover, in the case when the conductive fine particles are prepared as needle-shaped particles, those particles are preferably used as long as the length of the minor axis satisfies the above-mentioned average particle size conditions.

(Fine Particle Layer)

Such fine particles are allowed to adhere to a transparent substrate to form a fine particle layer. The fine particles in this fine particle layer may adhere to it as a single layer, or may adhere to it as a plurality of layers. Moreover, in the case when a plurality of layers are formed, a plurality of kinds of fine particles, for example, having mutually different fine particles, may be used as the respective layers.

Moreover, in the present Preferred Embodiment, the fine particle layer may be formed only on one side face of the substrate or may be formed on both of the sides of the substrate when it is prepared as a plate shaped substrate.

In the fine particle layer in the present Preferred Embodiment, with respect to a preferable amount of adhesion of the fine particles onto the transparent substrate, that is, with respect to a preferable amount of charge of fine particles into a fine particle layer, in the case when the amount of adhesion is represented by a volume percentage of fine particles in the fine particle layer, that is, by a fine particle rate of occupation per unit volume of the fine particle layer, it is preferably set in the range from 10 volume % to 90 volume %, more preferably, in the range from 20 volume % to 80 volume %. The volume percentage of the fine particles smaller than the above-mentioned range fails to allow the fine particle layer to be optically recognized as a layer, thereby failing to exert an antireflection effect. Furthermore, the volume percentage greater than the above-mentioned range causes a reduction in the gap between the fine particles, thereby failing to exert the typical effect of the present invention in which the bulk refractive-index of the fine particle layer is reduced by the above-mentioned gap so as to improve the antireflection effect. Here, the upper limit of the volume percentage of the fine particles in the fine particle layer in the case when each of the fine particle has a true spherical shape in a single dispersion manner is set to 60 volume % in the case of a single layer of the fine particles in the fine particle layer and to 74 volume % in the case of a multi-layered film, independent of the above-mentioned range.

Here, the volume percentage of the fine particles in the fine particle layer in the present Preferred Embodiment, that is, the rate of occupation of fine particles per unit volume of the fine particle layer is found by the following two methods.

In the first method, supposing that the volume percentage is $\Phi$, the value is calculated through the following equation (a)

$$\Phi = \pi a^3 N / 6Sd, \text{ where } d \geq an \qquad (a)$$

Here, S represents the substrate surface area, a is the average particle size of the fine particles, d represents the thickness of all the particle layers, n represents the number of particle layers, and N represents the number of particles. These values can be obtained through actual measurements, etc. of the fine particle layer surface and cross-sectional photograph.

In particular, when the particle layer is only one layer, the following equation (b) may be used supposing that d=a:

$$\Phi = \pi a^2 N / 6S \qquad (b)$$

In the second method, the value is found by using the following equation (c):

$$\Phi = (n_{cal} - n_{air}) / (n_p - n_{air}) \qquad (c)$$

Here, $n_p$ represents the refractive index of the particles, $n_{air}$ represents the refractive index of the gap between the particles, $n_{cal}$ represents the bulk refractive index of the fine particle layer that is found through simulations. Here, since the fine particle layer of the present invention is sufficiently transparent, it is possible to find the bulk refractive index of the fine particle layer through simulations by using data such as reflection spectrum, etc., independent of the single layer or multi-layered structure of the fine particle layer.

The fine particle layer in the present Preferred Embodiment is normally formed by the fine particles and gas (normally, air) located between the fine particles. However, the present Preferred Embodiment is not intended to be limited by this structure; and, for example, in the case when any reinforcing adhesive means, which will be described later, is used, a predetermined resin, etc., may be located in place of the above-mentioned gas.

In the present Preferred Embodiment, the refractive index of the fine particle layer serving as a bulk including the fine particles and gas located between them and resin, etc., located as other components needs to be set smaller than the refractive index of the transparent substrate. This is because, in the case when the bulk refractive index is the same as or greater than the refractive index of the transparent substrate, it is not possible to apply the antireflection effect.

The bulk refractive index in this fine particle layer is an important factor that gives a great influence on the antireflection effect. In the present Preferred Embodiment, the bulk refractive index of the fine particle layer can be adjusted comparatively easily. In other words, the bulk refractive index can be easily set to an optimal value by adjusting factors such as the kinds of fine particles and the amount to be adhered, thereby making it possible to provide an antireflection film having an optimal antireflection effect. The optimal value of this bulk refractive index, which varies depending on the kinds of the transparent substrate, is normally set in the range of 1.05 to 1.60, in particular, in the range of 1.05 to 1.50, most preferably, in the range of 1.05 to 1.46, supposing that the transparent substrate is generally used glass, PET, etc.

Moreover, the film thickness of the fine particle layer, which is also a major factor that gives a great effect on the antireflection effect, and in the present Preferred Embodiment, is preferably set in the range of 50 nm to 300 nm, more preferably, in the range of 70 nm to 250 nm. The film thickness of the fine particle layer out of the above-mentioned range causes a reduction in the antireflection effect of the finally obtained antireflection film.

In the present invention, a plurality of layers may be used as the fine particle layer as described above, and in this case, one layer is provided as a layer having a thick layer thickness using great fine particles having a comparatively large particle size, while the other layer is provided as a thin layer thickness using small fine particles having a comparatively small particle size; thus, it is preferable to provide a two-layer structure. The reason for this is explained as follows:

In general, it is possible to change the wavelength the reflection of which is most effectively prevented by a film in question by changing the particle size of the fine particles within the fine particle layer. More specifically, the greater the film thickness (the particle size of the fine particles), the greater the wavelength of light the reflection of which is prevented by the film. Therefore, in accordance with the usage of the antireflection property, the particle size of the fine particles is selected so that a fine particle layer may be formed to provide the most preferable antireflection effect. However, the particle size of fine particles commercially available is often limited to a fixed particle size, and it is sometimes difficult to obtain fine particles having a required particle size.

In such a case, a fine particle layer is formed by using fine particles having a fixed particle size that are commercially available (a fine particle layer using fine particles having a greater particle size), and a fine particle layer using fine particles having a smaller particle size is further formed; thus, the wavelength having the highest antireflection effect may be shifted and adjusted to be positioned at which the antireflection effect becomes most effective.

In this case, the fine particle layer using the fine particles having a greater particle size is preferably set to have a film thickness of the fine particle layer in the range of 50 to 300 nm, more preferably, in the range of 70 to 180 nm. Moreover, the fine particles having the average particle size in the range of 50 to 300 nm are preferably used, and in particular, the fine particles having the average particle size in the range of 70 to 180 nm are more preferably used. This is because, as described above, the average particle size smaller than the above-mentioned range is not preferable since the film thickness of the fine particle layer becomes too thin, thereby failing to provide a sufficient antireflection effect; moreover, the average particle size exceeding the above-mentioned range allows the fine particle layer to reflect the incident visible light in a scattering and diffusing manner, thereby reducing the visible light transmittance.

Here, in the fine particle layer using fine particles having a smaller particle size, the film thickness of the fine particle layer is set in the range of 1 to 50 nm, more preferably, in the range of 1 to 30 nm. In this case, it is preferable to use fine particles the average particle size of which is set in the range of 1 to 50 nm, more preferably, in the range of 1 to 30 nm. As the average particle size of the fine particles becomes smaller, it is more preferable since the position of the wavelength having the highest antireflection effect can be adjusted more precisely; however, in the case when the average particle size is smaller than the above-mentioned range, a problem might arise in the handling of the fine particles.

In the present invention, the layer using fine particles having a greater particle size is not limited to a single layer, and may be constituted by a plurality of layers. Moreover, in the same manner, the layer using fine particles having a smaller particle size is not necessarily provided as a single layer, and may be constituted by a plurality of layers. Furthermore, with respect to the layer using fine particles having a greater particle size and the layer using fine particles having a smaller particle size, either of them may be formed earlier on the transparent substrate.

Moreover, in the present invention, the material of the fine particles used for the layer having a greater particle size and the material of the fine particles used for the layer having a smaller particle size may be the same material, or may have different materials. For example, with respect to the material for particles having a greater particle size, a material having a comparatively small refractive index such as $SiO_2$ may be selected, and with respect to the material of the particles having a smaller particle size, the aforementioned conductive fine particles such as tin oxide may be used. Thus, it is possible to adjust the position of wavelength having the highest antireflection effect, and consequently to improve the antireflection effect as a whole; thus, it becomes possible to apply a static eliminating effect to the antireflection film.

(Electrostatic Interaction)

One of the features of the present Preferred Embodiment is that fine particles are allowed to adhere to the transparent substrate by at least an electrostatic interaction. In this manner, the adhesion of fine particles to the transparent substrate, that is, the formation of a fine particle layer on the transparent substrate, is carried out by the electrostatic interaction; therefore, in the present Preferred Embodiment, the fine particles are uniformly placed on the transparent substrate so that a fine particle layer having a high antireflection effect can be formed on the transparent substrate.

In the case when fine particles are allowed to adhere to the transparent substrate through such an electrostatic interaction, although not particularly limited, a method is adopted, in which a charge, either positive or negative, is normally applied to the transparent substrate, and by using fine particles having a charge having a polarity opposite to this charge are used so that the fine particles are allowed to adhere to the transparent substrate through an electrostatic interaction.

With respect to the method for applying a charge onto the surface of the transparent substrate, there are two cases in which the surface of the transparent substrate is simply charged physically and in which an ionic functional group is applied to the surface of the transparent substrate physically or chemically. In the present Preferred Embodiment, since the former is poor in the stability of a charge, it is preferable to use a method for applying an ionic functional group onto the substrate surface of the latter With respect to the method for introducing an ionic functional group onto the substrate surface, methods such as a corona charging process, a glow discharging process, a plasma process, an hydrolysis process, a silane coupling process, coating of a polymer electrolyte and formation of a polymer electrolyte multi-layered film may be listed; and in the present Preferred Embodiment, it is preferable to form a polymer electrolyte film obtained by coating a polymer electrolyte. The reason for this is explained as follows:

First, in general, when the charge density on the surface of the transparent substrate is great, it is possible to form a fine particle layer having a higher antireflection effect with fine particles being allowed to uniformly adhere to the transparent substrate. Here, by forming a polymer electrolyte film on the transparent substrate, it becomes possible to increase the charge density as compared with other methods. Therefore, a polymer electrolyte film is formed on a transparent substrate, and fine particles are allowed to adhere onto the transparent substrate, that is, onto the polymer electrolyte through an electrostatic interaction between the polymer electrolyte film and the fine particles; thus, it is possible to obtain a fine particle layer with fine particles uniformly adhering thereto, and consequently to form an antireflection film having a high antireflection effect.

Moreover, in the corona discharging process, the glow discharging process, the plasma process and the hydrolysis process, in most cases, an ionic functional group, generally introduced, is an anionic group. Therefore, the charge on the fine particle surface is limited to cation. Here, in the case of the polymer electrolyte, anionic property, cationic property, and the density and balance of these may be preferably selected; therefore, the charge on the fine particle surface is not limited to either anion or cation. From this point of view also, with respect to a method for applying a charge on the surface of the transparent substrate, it is preferable to form a polymer electrolyte film made of a polymer electrolyte.

Here, since, inmost cases, the surface of the transparent substrate has a hydrophobic property, the combination of the above-mentioned method is also effective as a method for applying a sufficient charge onto the substrate surface. For example, after at least one method selected from the group consisting of the corona discharging process, glow discharging process, plasma process, hydrolysis process and silane coupling process has been carried out on a substrate surface, a polymer electrolyte may be coated thereon, or a polymer electrolyte multi-layered film may be formed; thus, these form preferable methods.

In the case when a charge is applied to the surface of the transparent substrate by forming the polymer electrolyte film, it is preferable to set the film thickness of the polymer electrolyte film thinner than the average particle size of the fine particles; moreover, it is also preferable to set the film thickness of the polymer electrolyte to be less than 50% of the average particle size of the fine particles. When the film thickness of the polymer electrolyte is not less than the average particle size of the fine particles, two layers of the fine particles are partially stacked causing the incident visible light to scatter and voids between the fine particles to be reduced or to be filled; thus, this case might cause a defective antireflection film, and is not preferable.

In the present Preferred Embodiment, with respect to such a polymer electrolyte film, it is preferable to provide it as a multi-layered film that is formed by sequential deposition not less than two polymer electrolytes having mutually different polarities. With respect to the forming method of such a polymer electrolyte multi-layered film, the known so-called alternate adsorption film forming method (Layer-by-Layer Assembly method) may be preferably used. In this method, a substrate is alternately dipped in a cationic polymer electrolyte water solution and an anionic polymer electrolyte water solution so that a polymer electrolyte multi-layered film is formed on the substrate with a film-thickness control in nano-meter order (for example, Gero Decher, et al., Science, Vol. 277, page 1232, 1997; Seimei Shiratori, et al., Technical Report of Communication Society, OME98-106, 1998; Joseph B. Schlenoff, et al., Macromolecules, Vol. 32, page 8153, 1999). In accordance with this method, even when the polymer electrolyte multi-layered film has a film thickness of not less than the particle size of the fine particles, the fine particle film is formed as a single particle film. The reason for this is that the polymer electrolyte multi-layered film forms a polymer complex that is insoluble to a medium (mainly, water), and is hardly dispersed in the medium, with the fine particles having an interaction with virtually only the surface of the polymer electrolyte multi-layered film.

Many examples in which an alternate multi-layered film is formed by using a polymer electrolyte and fine particles or a single particle film is formed have been reported (for example, alternate multi-layered film: Kunitake et. al, Chemistry Letters, page 125, 1997; single particle film: Akashi et. al, Langmuir, Vol. 14, page 4088, 1998). However, none of the prior art including these have reported the antireflection function of a single particle film.

Moreover, in the present Preferred Embodiment, the polymer electrolyte for forming the polymer electrolyte film is preferably prepared as a cross-linked polymer electrolyte. By using the cross-linked polymer electrolyte, it is possible to prevent undesirable unnecessary multi-layered particles. This cross-linked polymer electrolyte is preferably used in both of the cases in which the polymer electrolyte is formed as a single layer and the polymer electrolyte is formed as multi-layers; and in the case of the polymer electrolyte multi-layers, the polymer electrolyte with only the uppermost layer being cross-linked maybe used, or the polymer electrolyte with all the layers being cross-linked may be formed.

In the present Preferred Embodiment, in the case when a fine particle layer is formed through an electrostatic interaction using such a polymer electrolyte film with a plurality of layers of fine particles being formed, the following methods may be used: one method in which a polymer electrolyte film is formed and fine particles are allowed to adhere to this, and on this are repeated the formation of a polymer electrolyte film and the adhesion of the fine particles and another method in which a polymer electrolyte is formed with a predetermined film thickness and this is allowed to contact a fine particle dispersant so as to swell the polymer electrolyte film so that fine particles of a plurality of layers are formed by entrapping fine particles in this polymer electrolyte film.

With respect to the polymer electrolyte used in the present Preferred Embodiment, examples thereof include polyethylene imine and its quaternary compounds, polydiallyldimethyl ammonium chloride, poly (N,N'-dimethyl-3,5-dimethylene-piperidinium chloride), polyallyl amine and its quaternary compounds, polydimethyl aminoethyl(meth)acrylate and its quaternary compounds, polydimethyl aminopropyl (meth)acrylamide and its quaternary compounds, polydimethyl (meth)acrylamid and its quaternary compounds, poly(meth) acrylic acid and its ionized compounds, polystyrene sodium sulfonate, poly(2-acrylamide-2-methyl-1-propane sulfonic acid), polyamic acid, polyvinyl potassium sulfonate, and copolymers between monomers constituting the above-mentioned polymers and a nonionic aqueous solution monomer such as (meth)acrylamide, 2-hydroxyethyl(meth)acrylate, N-isopropyl(meth)acrylamide.

In the present Preferred Embodiment, among these, the following materials are preferably used: polyethylene imine quaternary compounds, polydiallyldimethyl ammonium chloride, poly (N, N'-dimethyl-3,5-dimethylene-piperidinium chloride), polyallyl amine quaternary compounds, polydimethyl aminoethyl(meth)acrylate quaternary compounds, polydimethyl(meth)acrylamide quaternary compounds, poly sodium (meth) acrylate, polystyrene sodium sulfonate, poly(2-acrylamide-2-methyl-1-propane sulfonic acid), polyvinyl potassium sulfonate, and copolymers between monomers constituting the above-mentioned polymers and a nonionic aqueous solution monomer such as (meth)acrylamide, 2-hydroxyethyl(meth)acrylate, N-isopropyl(meth)acrylamide.

Moreover, with respect to cross-linked polymer electrolyte, examples thereof include: cross-linked substances between monomers constituting the above-mentioned polymer electrolyte and a multifunctional monomer such as methylenebisacryl amide, a cross-linked substance resulting from a reaction between the above-mentioned polymer electrolyte and aldehydes, and cross-linked substance resulting from the application of electron beams or gamma rays onto the polymer electrolyte.

(Reinforcing Adhesive Means)

The antireflection film of the present Preferred Embodiment is formed by allowing fine particles to adhere to a transparent substrate through an electrostatic interaction to form a fine particle layer, and in the case when the fine particles are allowed to adhere to the transparent substrate only through the electrostatic interaction, this film has a problem with an abrasion resistant property, etc. in its practical use. In such a case, a reinforcing adhesive means for improving the adhesive strength of the fine particles onto the transparent substrate may be used.

With respect to such a reinforcing adhesive means, not particularly limited, examples thereof include: a means for irreversibly coupling the surface of the transparent substrate and the fine particles chemically, a means for fusing the surface of the transparent substrate and the fine particles and a means for forming a polymer thin film on the surface of the fine particle layer. These means may be used alone, or in combination.

The means for irreversibly coupling the surface of the transparent substrate and the fine particles chemically is a means for forming general bonds such as an ester bond, a urethane bond, an amide bond and an ether bond between the surface of the transparent substrate and the fine particles. In otherwords, in this means, functional groups capable of chemically forming irreversible bonds by respectively adhering to the surface of the transparent substrate and the fine particles are introduced, and during the formation of the fine particle layer through the electrostatic interaction or the succeeding process, these functional groups are allowed to react to chemically form the above-mentioned irreversible bonds. As to what kind of chemical bond is used or as to the kinds, etc. of the functional group to be introduced, it is possible to preferably select by taking into consideration factors such as the transparent substrate, the kind of fine particles and-the reaction property.

The means for fusing the surface of the transparent substrate and the fine particles is a means in which, after the fine particle layer has been formed through the electrostatic interaction, the fine particles and/or the transparent substrate is heated to fuse the surface of the transparent substrate and the fine particles. Upon using this means, in the case when an inorganic oxide such as silica or a metal oxide is used as the fine particles, it is preferable to use inorganic glass as the transparent substrate. This is because when the transparent substrate is a polymer substance, the transparent substrate fails to withstand the temperature at which the fine particles are fused. Here, in the case when the fine particles are a polymer material, a polymer substance may of course be used as the transparent substrate. In this case, the glass transition temperature of the transparent substrate is preferably set to be higher than the glass transition temperature of the fine particles, and more preferably, the glass transition temperature of the transparent substrate is set to be higher than the lowest film-forming temperature of the fine particles.

Upon application of this means, the fine particles (polymer fine particles) of polymers may be cross-linked to an extent capable of being fused to the transparent substrate. Moreover, the polymer fine particles maybe so-called core-shell particles in which a core having a high glass transition temperature and a shell having a low glass transition temperature are prepared. In this case, the glass transition temperature of the core may be higher than the glass transition temperature of the substrate.

Moreover, in the case when this means is used, not less than two kinds of fine particles may be used in combination. For example, a single particle film is formed on a transparent polymer substrate by using silica fine particles and polymer fine particles in combination, and by properly fusing the polymer fine particles to the substrate and the silica fine particles, it becomes possible to obtain an antireflection film that is superior in both of the adhesive property and the abrasion resistant property.

The means for forming the polymer thin film on the surface of the fine particle layer is a means for allowing the fine particles to adhere onto the transparent substrate through the electrostatic interaction to form a fine particle layer and for forming a polymer thin film on the fine particle layer. In this method also, it is possible to improve the abrasion resistant property of the antireflection film, and it is also possible to improve the corrosion resistant property by applying a fluoro-resin to the polymer thin film. Here, in the case when the means for forming a polymer thin film on the surface of the fine particle layer is used, as described earlier, the bulk refractive index of the fine particle layer containing this polymer thin film needs to be smaller than that of the transparent substrate.

In this case, in order to improve the abrasion resistant property, a cross-linked substance may be used as the polymer thin film. Here, the case in which the functional groups on the surface of the fine particles and the functional groups contained in the polymer substance forming the polymer thin film are allowed to react with each other is also referred to as the cross-linking process.

(Others)

With respect to the antireflection film of the present Preferred Embodiment, in the same manner as a normal antireflection film, another layer, for example, a high refractive index layer, an intermediate refractive index layer and a hard coat layer may be formed between the transparent substrate and the fine particle layer.

2. Manufacturing Method of the First Preferred Embodiment

The antireflection film of the first Preferred Embodiment is manufactured through the following processes: a charge applying process for applying a charge on the surface of the transparent substrate, a fine particle layer forming process for applying to the transparent substrate a fine particle dispersant containing fine particles having a surface charge the polarity of which is reversed to the charge applied to the surface of the transparent substrate to form a fine particle layer, and a cleaning process for cleaning the transparent substrate on which the fine particle layer is formed. The following description will discuss the manufacturing method of the first Preferred Embodiment.

(Charge Applying Process)

In the manufacturing method of the present Preferred Embodiment, the charge applying process for applying a charge on the surface of the transparent substrate is first carried out. With respect to the applying method of the charge to the transparent substrate, the charge is applied to the transparent substrate in the same method as that explained in the section (electrostatic interaction) in the description of the first Preferred Embodiment; therefore, the detailed explanation is omitted; however, the most preferable method (process) is a process in which, in the same manner as the above explanation, at least not less than two kinds of polymer electrolytes, having different polarities, are sequentially deposited on the surface of the transparent substrate to form a multi-layered film.

(Fine Particle Layer Forming Process)

A fine particle dispersant is applied onto the transparent substrate to which the charge is thus applied, so as to form a fine particle layer. With respect to the coating method at this time, not particularly limited, various known coating methods, for example, spray coating method, and bar coating method, etc., may be used; however, a method for dipping the transparent substrate to which the charge has been applied into a fine particle dispersant is preferably used particularly.

The fine particle dispersant used in the present process is formed by dispersing and suspending fine particles in a proper medium. With respect to the medium system, an aqueous system is most preferably used. This is because the present Preferred Embodiment utilizes the electrostatic interaction between the surface of the transparent substrate and the fine particle surface. Moreover, an emulsion and a dispersion stabilizing agent may be added thereto so as to stably disperse and suspend the fine particles. In this case, the emulsion and dispersion stabilizing agent are preferably selected as those having an ionic property, and the ionic property is preferably set to have a polarity reverse to the charge of the substrate surface, that is, the ionic property has the same polarity as the surface charge of the fine particles.

With respect to the fine particle dispersant having such a composition, it is possible to use a commercial product. More specifically, examples thereof include various kinds of colloidal silica made by Nissan Chemical Industries, Ltd., various acrylic emulsions and various latexes made by JSR (K.K.). Moreover, fine particles such as various polymer fine particle powders made by Soken Chemical (K.K.) may be obtained and these are dispersed in water under the presence of a proper emulsion and dispersion stabilizing agent to form a fine particle dispersant.

With respect to the pH of such a commercial fine particle dispersant, it widely ranges from the acidic property to the alkaline property. In the above-mentioned charge applying process, the polymer electrolyte film on the transparent substrate or the surface of the multi-layered film formed by sequential deposition of polymer electrolytes is formed by a weak electrolyte polymer substance, and in the case when it is a weak anionic polymer electrolyte such as a carboxylic acid-based polymer substance, the pH of the fine particle dispersant is preferably set from the neutral to the alkaline property. This is because under an acidic condition, a weak anion such as a carboxylic group is not subjected to ionic dissociation. Moreover, for example, in the case of a weak cationic polymer electrolyte such as an imine based polymer substance, the pH of the fine particle dispersant is preferably set from the neutral to the acidic property. This is because under an alkaline condition, a weak cation such as an imino group is not subjected to ionic dissociation. In the case when a strong anionic polymer electrolyte such as polystyrene sodium sulfonate or a strong cationic polymer electrolyte such as polydiallylmethylammoniumchloride is used, a fine particle dispersant ranging from the acidic to the alkaline condition property may be used. This is because a strong electrolyte is less susceptible to the pH in ionic dissociating property.

By adjusting the concentration of such a fine particle dispersant, it is possible to change the density of the fine particles in the fine particle layer to be formed. Then, by changing the density of the fine particles in the fine particle layer, it is possible to change the bulk refractive index in the fine particle layer; therefore, it can be said that the concentration of the fine particles in the fine particle dispersant forms a factor that gives a great effect on the antireflection property in the antireflection film. The concentration of the fine particles in such a fine particle dispersant, which varies greatly depending on various factors such as the bulk refractive index of the target fine particle layer, the kind of the fine particles and the type of the dispersant, and in general, those having a concentration the range of 3% by weight to 60% by weight, more preferably, those having a concentration in the range of 5% by weight to 50% by weight, may be used.

The fine particle layer forming process in the manufacturing method in the present Preferred Embodiment is completely different from methods such as Langmuir-Biodgett blow-jet method and a dip coating method in which a film-forming process is carried out while the substrate is being raised or being lowered. In the preferred mode of the present process, the film formation is carried out while the transparent substrate is being dipped in a fine particle dispersant. Therefore, in the case of the film formation on a sheet-type substrate, the film forming time is the same independent of the size of the substrate in principle. In other words, the dipping time required for the substrate to be dipped in the fine particle dispersant is the same independent of the size of the substrate. In contrast, in the case of Langmuir-Biodgett method and the dip coating method, the process is regulated by the substrate lowering optimal speed or the substrate raising optimal speed so that when the substrate becomes larger, the film-forming time becomes longer correspondingly. In addition, in the present process, it is possible to shorten the dipping time to several seconds. Moreover, another advantage of the present process is that the present process is applicable not only to the sheet type, but also to the so-called winding (roll-to-roll)type.

(Cleaning Process)

After the fine particle layer forming process has been carried out in this manner, a cleaning process is carried out so that the fine particles that have not adhered to the transparent substrate even through an electrostatic interaction during the fine particle forming process are cleaned and removed. This cleaning process is carried out in the same manner as a general cleaning process.

(Others)

If necessary, in the same manner as explained in the section (reinforcing adhesive means) in the first Preferred Embodiment, the process for applying the reinforcing adhesive means may be carried out. By carrying out such a process, it is possible to improve the abrasion resistant property of the resulting antireflection film.

3. Second Preferred Embodiment

The antireflection film in accordance with the second Preferred Embodiment of the present invention is provided with at least a transparent substrate, and a fine particle layer placed on the surface of the transparent substrate, having fine particles formed at least as a single layer, and having a bulk refractive-index that is lower than the refractive-index of the transparent substrate, and in this arrangement, the above-mentioned fine particle layer is a fine particle layer that is formed by allowing fine particles to adhere to the substrate surface through an electrostatic interaction between the substrate surface and the fine particles, on another substrate surface, and the antireflection film is formed by allowing this fine particle layer to be transferred on the transparent substrate.

The present Preferred Embodiment is different from the first Preferred Embodiment in that the present Preferred Embodiment preliminarily forms the fine particle layer on another substrate different from the transparent substrate of the antireflection film through an electrostatic interaction and is characterized in that this layer is transferred on the transparent substrate. With this arrangement, the second Preferred Embodiment has the following advantages:

In other words, in the Present Preferred Embodiment, by preliminarily applying a charge on another substrate, this another substrate may be used repeatedly. Therefore, upon manufacturing the antireflection film, it is not necessary to carry out the charge applying process; thus, it is possible to reduce the costs.

Moreover, since another substrate for forming the fine particle layer is not used as the transparent substrate for the final antireflection film, it has no limitations such as having to be transparent, and it is possible to provide a wide range of material selection. Therefore, the resulting effect is that the application of a charge to this substrate surface is easily carried out.

With respect to the material used for such a substrate, in addition to those materials explained in the transparent substrate section in the description of the first Preferred Embodiment, an opaque material may be selected. More specifically, for example, metal, rubber, elastomer, etc. may be used, and consequently, it is possible to form the fine particle layer on the substrate more easily.

Moreover, with respect to the shape of the substrate, a plate shaped one, etc., may be listed; however, a drum shaped substrate may be used. By providing the substrate as a drum shaped member, it becomes possible to carry out the succeeding transferring process more easily.

With respect to the electrostatic interaction between the substrate and the fine particles in the second Preferred Embodiment, the description thereof is the same as that given in the electrostatic interaction between the transparent substrate and the fine particles in the first Preferred Embodiment, and in the same manner, as a preferable example, the application of a polymer electrolyte film is listed. In the present Preferred Embodiment, a polymer electrolyte that is cross-linked to the polymer electrolyte film is preferably used. This is because, in addition to the reason as explained in the first Preferred Embodiment, in the case when the cross-linked polymer electrolyte is used, since more strength is given as compared with the case in which no cross-linking is provided, the polymer electrolyte film is less susceptible to damages when the fine particle layer is transferred from the substrate to the transparent substrate, thereby making it possible to improve the transferring durability of the polymer electrolyte film. Therefore, many antireflection films are manufactured from one substrate, and it is possible to reduce the costs of the antireflection film.

Moreover, with respect to the fine particle layer formed on another substrate, it is easily transferred onto the transparent substrate by applying a conventionally used transferring method (for example, see Japanese Patent Application Laid-Open No. 07-225302). With respect to the adhesive means between the transparent substrate and the fine particle layer used at the time of the transferring operation or after the transferring operation, the adhesive reinforcing means explained in the first Preferred Embodiment, as it is, maybe used, and in addition to these, a means in which an adhesive layer is formed on the surface of the transparent substrate and the fine particles in the fine particle layer are bonded to the adhesive layer may also be used. The bonding strength of the adhesive layer needs to be set greater than the adhesive strength caused by the electrostatic interaction of the fine particles to the substrate, and with respect to the material to be used as the adhesive layer, any material maybe used without limitation as long as it has this much bonding strength to the particles and it is also transparent in the visible light range. Examples of these include acryl-based adhesive agents, urethane-based adhesive agents, silicone-based adhesive agents, vinyl acetate based adhesive agents, and proper mixed-type adhesive agents of these. More preferably, those materials that exert an adhesive property at room temperature are preferably used. After allowing particles to adhere to this adhesive layer and a particle layer is transferred thereon, the adhesive layer may be cured by applying heat, ultraviolet lights, electronic beams, etc. thereon.

A plurality of the above-mentioned respective adhesive means may be used in combination in the present Preferred Embodiment.

Here, with respect to another construction, it is the same as the first Preferred Embodiment; therefore, the description thereof is omitted. Moreover, in the present Preferred Embodiment also, in the same manner as the first Preferred Embodiment, another layer, more specifically, a high refractive index layer and an intermediate refractive index layer, etc., may be formed between the fine particle layer and the transparent substrate, if necessary.

4. Manufacturing Method of the Second Preferred Embodiment

A manufacturing method in accordance with the second Preferred Embodiment of the antireflection film of the present invention is characterized by including: a charge applying process for applying a charge to a substrate surface, a fine particle layer forming process for applying to the transparent substrate a fine particle dispersant containing fine particles having a surface charge the polarity of which is reversed to the charge applied to the substrate surface to form a fine particle layer, a cleaning process for cleaning the substrate on which the fine particle layer is formed, and a transferring process for transferring the fine particle layer formed on the substrate onto the transparent substrate.

The manufacturing method of the present Preferred Embodiment is different from the manufacturing method of the first Preferred Embodiment in that the charge applying process is carried out not on the transparent substrate, but on another substrate, and in that a transferring process for transferring the fine particle layer formed on this another substrate onto the transparent substrate is installed. With respect to a point except for these points, it is the same as what has already explained; therefore, the description thereof is omitted. Concerning a point of difference described above, it has already explained in the description of the second Preferred Embodiment; therefore, the description thereof is omitted.

Moreover, in the manufacturing method of the present Preferred Embodiment also, in the same manner as the manufacturing method of the first Preferred Embodiment, it is possible to install an adhesive means for improving the adhesive strength between the fine particles and the transparent substrate, and for improving-the abrasion resistant property, if necessary. This adhesive means is the same as that explained in the first Preferred Embodiment; therefore, the description thereof is omitted, with only the adhesive means using the adhesive layer that is a featured adhesive means in the second Preferred Embodiment being explained by reference to FIG. 1.

FIG. 1 is one example that explains the adhesive means using the adhesive layer. A polymer electrolyte film 2 is formed on a drum shaped (tube shape) substrate 1 through a charge applying process, and a fine particle layer 3 is allowed to adhere to this polymer electrolyte film through an electrostatic interaction by the fine particle layer forming process. Here, an adhesive layer 5 is formed on the surface of the transparent substrate 4 (FIG. 1(*a*) ) . Next, the substrate 1 is rotated while a predetermined pressure being applied onto the adhesive layer 5 so that the fine particle layer 3 is transferred onto the adhesive layer 5 (FIG. 1(*b*) . The substrate 1 from which the fine particle layer has been removed is recycled. Then, energy 6 such as heat, ultraviolet rays and electron beams is applied onto the adhesive layer 5 so that this is cured and the fine particle layer 3 is firmly bonded to the adhesive layer 5.

Here, FIG. 1(*a*) is shown as if there was a space between the fine particle layer 3 and the polymer electrolyte film 2; however, in the present invention, the fine particle layer 3 is formed on the polymer electrolyte film 2 in a contact manner.

5. Third Preferred Embodiment

In the third Preferred Embodiment, a fine particle layer is formed on a substrate, and a printing plate is formed by using this as an original plate so that an antireflection film is formed by using this printing plate. The following description will discuss the manufacturing method of the third Preferred Embodiment.

Moreover, the manufacturing method of an antireflection film in accordance with the third Preferred Embodiment is characterized by including: a charge applying process for applying a charge on a substrate surface, a fine particle layer forming process for applying to the transparent substrate a fine particle dispersant containing fine particles having a surface charge the polarity of which is reversed to the charge applied to the substrate surface to form a fine particle layer, a cleaning process for cleaning the substrate on which the fine particle layer is formed, a printing plate forming process for forming a printing plate by molding a printing plate material using the fine particle layer on the transparent substrate cleaned in the cleaning process as an original plate, and a fine particle duplicate layer forming process for forming a fine particle duplicate layer on the transparent substrate by using the printing plate manufactured through the printing plate forming process.

By manufacturing the antireflection film through the above-mentioned method, it is possible to use a conventional manufacturing process, and consequently to reduce the costs of the resulting antireflection film.

Among the manufacturing processes of the above-mentioned third Preferred Embodiment, the charge applying process, the fine particle layer forming process and the cleaning process are the same as those explained in the second Preferred Embodiment; therefore, the description thereof is omitted.

After the cleaning process, the substrate having the resulting fine particle layer is subjected to a printing plate forming process. This printing plate forming process is a process for forming a printing plate by molding a printing plate material using the fine particle layer on the transparent substrate; and with respect to the molding method used here, examples thereof include: a molding process using silicone rubber, a molding process using an acrylic resin, a molding process using a material that is subjected to gelation, a thermal pressing method and a plating (galvanoforming) method, and among these, the molding process using silicone rubber, the molding process using an acrylic resin, the thermal pressing method and the plating (galvanoforming) method are preferably used.

Figure 2B:
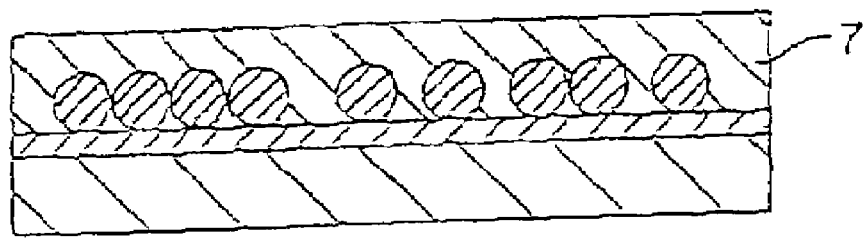
Figure 2C:
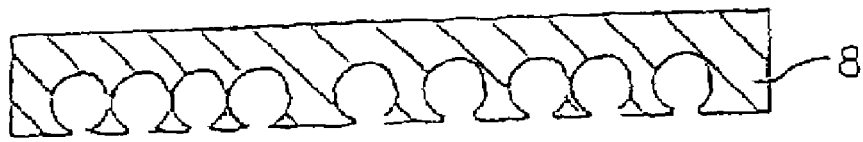

Referring to FIG. 2, an explanation will be given of one example of the specific printing plate manufacturing process. First, a polymer electrolyte film 2 is formed on a substrate 1 through the charge applying process, and a fine particle layer 3 which is allowed to adhere to the polymer electrolyte film 2 through an electrostatic interaction is formed through the fine particle layer forming process, and unnecessary fine particles are removed through the cleaning process to prepare a substrate 1 (FIG. 2(a)). Next, a printing plate material 7 is applied onto the fine particle layer 3 so that the molding process of the fine particle layer 3 is carried out (FIG. 2(b)). Then, by removing the fine particles in the fine particle layer 3, a printing plate 8 is obtained.

Here, the mold of the fine particles in the printing plate 8 thus obtained is shown in the Figure as an example that is accurately molded; however, in the present Preferred Embodiment, it is not necessarily to carry out an accurate molding process. In other words, the molding process may be carried out to an extent that sufficiently exerts an antireflection effect when the fine particle duplicate layer is formed on the transparent substrate in the fine particle duplicate layer forming process, which will be described later.

With respect to the printing plate material that is used in such a printing plate manufacturing process, examples thereof include silicone rubber, acrylic resin, sol-gel materials, polypropylene, polyethylene, polycarbonate, nickel, copper, silver, gold, and chromium; and silicone rubber, acrylic resin, polypropylene, polyethylene, polycarbonate, nickel, copper, and chromium are preferably used.

By using the resulting printing plate obtained through the above-mentioned printing plate manufacturing process, the fine particle duplicate layer forming process is carried out to form a fine particle duplicate layer on the transparent substrate. This fine particle duplicate layer forming process is not particularly limited as long as it is a method for forming a duplicate of the fine particles on the transparent substrate by using the printing plate. More specifically, for example, the recessed sections of the printing plate is filled with ink (fine particle duplicate layer forming material), and this is printed onto the transparent substrate. Here, depending on the fine particle duplicate layer forming materials, after printing has been made on the transparent substrate, the material may be cured by applying heat, ultraviolet rays, electron beams, etc. thereon. Moreover, in another example of the method, one layer of a fine particle duplicate layer forming material is preliminarily formed on the transparent substrate, and by pressing the printing plate onto this layer to insert a fine particle duplicate layer forming material into the recesses of the printing plate, and the printing plate is then separated therefrom so as to form a fine particle duplicate layer on the transparent substrate. In this case also, depending on the fine particle duplicate layer forming materials, it is possible to carry out a curing process by applying heat, ultraviolet rays, electron beams, etc. thereon, and with respect to the timing of the application, it may be applied either before or after the separating process of the printing plate.

With respect to the fine particle duplicate layer forming material, it is not particularly limited as long as it is a transparent, moldable material; and more specifically, examples thereof include acryl-based materials, urethane-based materials, silicone-based materials, vinyl acetate-based materials and polycarbonate, and among these, acryl-based materials, urethane-based materials and polycarbonate are preferably used.

With respect to the shape of the fine particle duplicate layer formed in the above-mentioned fine particle duplicate layer forming process, it is not necessarily the same as the fine particle layer that is the original plate, and may be revised as long as it exerts the antireflection effect as the fine particle duplicate layer.

Here, the present invention is not intended to be limited by the above-mentioned Preferred Embodiments. Those Preferred Embodiments are given as examples, and any technique having virtually the same construction and the same functions and effects as the technical idea disclosed in the claims of the present invention is included within the technical scope of the present invention.

EXAMPLES

The following description will discuss the antireflection film of the present invention in more detail by equipment of Examples.

Example 1

Charge Application to a Substrate: Formation of a Polymer Electrolyte Film

By using an alternate adsorption film forming method, an aqueous solution (dissolved in pure water) of polydial-lyldimethyl ammonium chloride(PDDA) (20 mM) (monomer unit conversion) (made by Aldrich Co., Ltd., molecular weight: 100,000 to 200,000) and an aqueous solution (dissolved in pure water) of polystyrene sulfonate sodium salt (PSS) (20 mM) (monomer unit conversion) (made by Aldrich Co., Ltd., molecular weight: 70,000) were applied so that alternate adsorption films were formed on both of the surfaces of a glass substrate. The formation of the uppermost layer was carried out by using PDDA. (Formation of a single particle film: formation of a fine particle layer)

The above-mentioned base material was immersed in silica sol (made by Nissan Chemical Industries, Ltd.: Snow Tech ZL, particle size: 70 to 100 nm) for 30 seconds at room temperature, and then this was sufficiently cleaned, and dried to obtain sample 1 having single particle films formed on both of the surfaces of the substrate.

Example 2

Charge Application to a Substrate: Formation of a Polymer Electrolyte Film

A cationic polymer electrolyte (made by Dai-Ichi Kogyo Seiyaku Co., Ltd., C-200H) ultra-thin film was formed on a surface of a glass substrate by a spin coating method.

Formation of a Single Particle Film: Formation of a Fine Particle Layer

By using the same silica sol as Example 1, and a single particle film was formed on one side face of a substrate in the same manner as Example 1; thus, sample 2 was prepared.

Example 3

Charge Application to a Substrate: Formation of a Polymer Electrolyte Film

A tri-acetylated cellulose (TAC) film was processed for two minutes at 70° C. in an aqueous solution of 2-normal potassium hydroxide, and the surface thereof was subjected to a hydrophilic-property-applying treatment. After the treatment, the TAC film was used so as to form an alternate adsorption film on the film surface by using an aqueous solution in which PDDA and PSS were dissolved in 0.1M NaCl solution at the same concentrations as Example 1.

Formation of a Single Particle Film: Formation of a Fine Particle Layer

By using the same materials as Example 1, the above-mentioned base material was processed in the same manner to prepare sample 3 on both of the surfaces of which single particle films were formed.

Example 4

Formation of a Single Particle Film: Formation of a Fine Particle Layer

TAC substrate, prepared by the same preparation method as Example 3, was immersed in acrylic emulsion with 20 wt % of solid components (particle size 130 nm) for 30 seconds, and this was then cleaned to obtain sample 4 on both of the surfaces of which single particle films were formed.

Example 5

Charge Application to a Substrate: Formation of a Polymer Electrolyte Film

By using the same polymer electrolyte solution as Example 1, alternate adsorption films were formed on both of the surfaces of a glass substrate. The film thickness measured by a surface probe microscope (SPM) was 2 to 4 nm.

Formation of a Single Particle Film: Formation of a Fine Particle Layer

The above-mentioned base material was immersed in colloidal silica (made by Nissan Chemical Industries, Ltd., MP-1040, average particle size 110 nm) for 10 seconds, and this was then cleaned to form a single particle film. The films were formed on both of the surface to prepare sample 5, and the film was formed on one surface to prepare sample 6.

Example 6

Charge Application to a Substrate: Formation of a Polymer Electrolyte Film

By using the same polymer electrolyte solution as Example 3, an alternate adsorption film was formed on the surface of a glass substrate. The film thickness measured by SPM was 15 to 20 nm.

Formation of a Single Particle Film: Formation of a Fine Particle Layer

By using the same colloidal silica as Example 5, the same processes as Example 5 were carried out to form a single particle film. The films were formed on both of the surface to prepare sample 7, and the film was formed on one surface to prepare sample 8.

Example 7

Charge Application to a Substrate: Formation of a Polymer Electrolyte Film

In the same manner as Example 6, an alternate adsorption film was formed on one surface of a glass substrate.

(Formation of a Single Particle Film: Formation of a Fine Particle Layer and Thermal Treatment)

The same acrylic emulsion as Example 4 was used for forming a single particle film on the above-mentioned glass substrate, and this was subjected to a thermal treatment at 75° C. for a predetermined time. This was prepared as sample 9. Here, the glass transition temperature of the acrylic particles was 69° C.

Example 8

Charge Application to a Substrate: Formation of a Polymer Electrolyte Film

The same processes as Example 6 were carried out to form alternate adsorption films on both of the surfaces of the substrate.

Formation of a Single Particle Film: Formation of a Fine Particle Layer

By using emulsion AE137 (brand name) made by JSR (K.K.), the same processes as Example 1 were carried out to form single particle films on both of the surfaces thereof; thus, sample 10 was prepared.

Example 9

Charge Application to a Substrate: Formation of a Polymer Electrolyte Film

The same processes as Example 6 were carried out to form alternate adsorption films on both of the surfaces of the substrate.

Formation of a Single Particle Film: Formation of a Fine Particle Layer

By using latex JSR0693 (brand name) made by JSR (K.K.), the same processes as Example 1 were carried out to form single particle films on both of the surfaces thereof; thus, sample 11 was prepared.

Example 10

Charge Application to a Substrate: Formation of a Polymer Electrolyte Film

The same processes as Example 6 were carried out to form alternate adsorption films on both of the surfaces of the substrate.

Formation of a Single Particle Film: Formation of a Fine Particle Layer

By using emulsion AE373B (brand name) made by JSR (K.K.), the same processes as Example 1 were carried out to form single particle films on both of the surfaces thereof; thus, sample 12 was prepared.

Example 11

First Charge Application to a Substrate: Formation of a Polymer Electrolyte Film The same processes as Example 1 were carried out to form alternate adsorption films on both of the surfaces of a glass substrate.

Formation of Two-layer Particle Film: Formation of a First Fine Particle Layer

By using Snow Techs 50 (brand name) that is silica sol (made by Nissan Chemical Industries, Ltd., a first fine particle layer was formed in the same manner as Example 1.

Application of Charge to First Fine Particle Layer: Formation of Polymer Electrolyte Film The base material on which the first fine particle layer has been formed is immersed in a PDDA solution for two minutes, and then cleaned with pure water.

Formation of Two-layer Particle Film: Formation of a Second Fine Particle Layer

By using colloidal silica MP-1040 (brand name) made by Nissan Chemical Industries, Ltd., the same processes as Example 1 were carried out to form a second fine particle layer, thereby preparing sample 13.

Example 12

Charge Application to a Substrate: Formation of a Polymer Electrolyte Film

A 20 mM aqueous solution (containing 0.1M NaCl) of a (diallyldimethyl ammonium chloride-acrylamide) copolymer (DDA-co-AAm) made by Aldrich Co., Ltd. and a PSS aqueous solution used in Example 3 were used to form an alternate adsorption film. The uppermost layer was formed by DDA-co-AAm.

Formation of a Fine Particle Film: Formation of Two-layered Fine Particle Layer

By using the same Snow Tech ZL (brand name) as Example 1, the same film-forming processes as Example 1 were carried out, with the result that sample 14 in which two layers were laminated at one time was prepared. In comparison with PDDA, since DDA-co-AAm contains an AAm component which is free from a strong interaction with the fine particles, it has a long dispersion range to the fine particle dispersion phase; therefore, it is assumed that two of fine particle layers are deposited at one time.

Example 13

First Charge Application to a Substrate: Formation of a Polymer Electrolyte Film TAC film was subjected to an alkaline process in the same method as Example 3. Alternate adsorption films were formed on both of the surfaces of this film in the same method as Example 1.

Formation of a Static Eliminating Film: Formation of a First Fine Particle Layer Needle-shaped tin (antimony dope) water dispersing element FS-10D (brand name) made by Ishihara Sangyo K.K. was used to form a first fine particle layer. After the film formation, hardly any fog was observed on the film. The surface resistivity was $6.8 \times 10^9 \Omega/\square$.

Charge Application to the First Fine Particle Layer: Formation of Polymer Electrolyte Film After the substrate having the first fine particle layer formed thereon had been immersed in a PDDA solution for two minutes, this was cleaned with pure water.

Formation of Antireflection Film: Formation of a Second Fine Particle Layer

By using colloidal silica MP-1040 (brand name) made by Nissan Chemical K.K., the second fine particle layer was formed in the same manner as Example 1, thereby providing sample 15. The surface resistivity was $2.5 \times 10^{10} \Omega/\square$, and it still exerted a static charge eliminating property even after the formation of the silica particle layer.

Example 14

Transferring Operation of Fine Particle Layer

In the same manner as Example 5, a sample on one surface of which the fine particle layer was formed was used, and the fine particle layer was transferred on a cellophane tape. After the transferring process, the transmission spectrum of the glass substrate was the same as coarse glass, and the transferring process is carried out desirably. The transmittance of the cellophane tape on which the fine particle layer had been formed was improved as compared with a raw cellophane tape.

Example 15

Molding Process of a Fine Particle Layer

A sample, formed by using acrylic emulsion used in Example 4, was used for carrying out nickel plating on the surface of this sample through an electroless plating method. This plated subject was carefully separated from the glass base material, and acrylic particles were removed therefrom by using toluene; thus, a printing plate was prepared.

Duplicate Fine Particle Layer Using the Printing Plate

A ultraviolet ray curing type acrylic composition was put on the printing plate, and after having been cured by ultraviolet rays, this was carefully separated from the printing plate. The transmittance of this separated matter was approximately 2% higher than that of a construction formed by placing an acrylic composition on a glass substrate to be cured thereon.

Evaluation

With respect to samples 1 to 9 from Example 1 to Example 7, the transmittance and reflectance were measured by the following measuring method.

Measuring Methods of Transmittance Spectrum

A spectrophotometer UV-3100PC made by Shimadzu Corporation was used with an incident angle of 0° (vertical incidence).

Measuring Methods of Reflectance Spectrum

A UV-3100PC, a large-scale sample base MPC-3100 made by Shimadzu Corporation and an absolute reflectance measuring equipment ASR-3105 using an incident angle of 5° made by Shimadzu Corporation were used. With respect to samples, a black tape was bonded to the rear face of each sample in order to eliminate the rear face reflection of the substrate.

Measuring Method of the Surface Resistivity

Hi rester UP MCP-HT450 (URS probe) made by Mitsubishi Chemical Corporation was used, and measurements were carried out at a voltage 10 V under an ambient condition of a humidity of 40%.

Characteristics of Sample 1 and Sample 2

Figure 3:
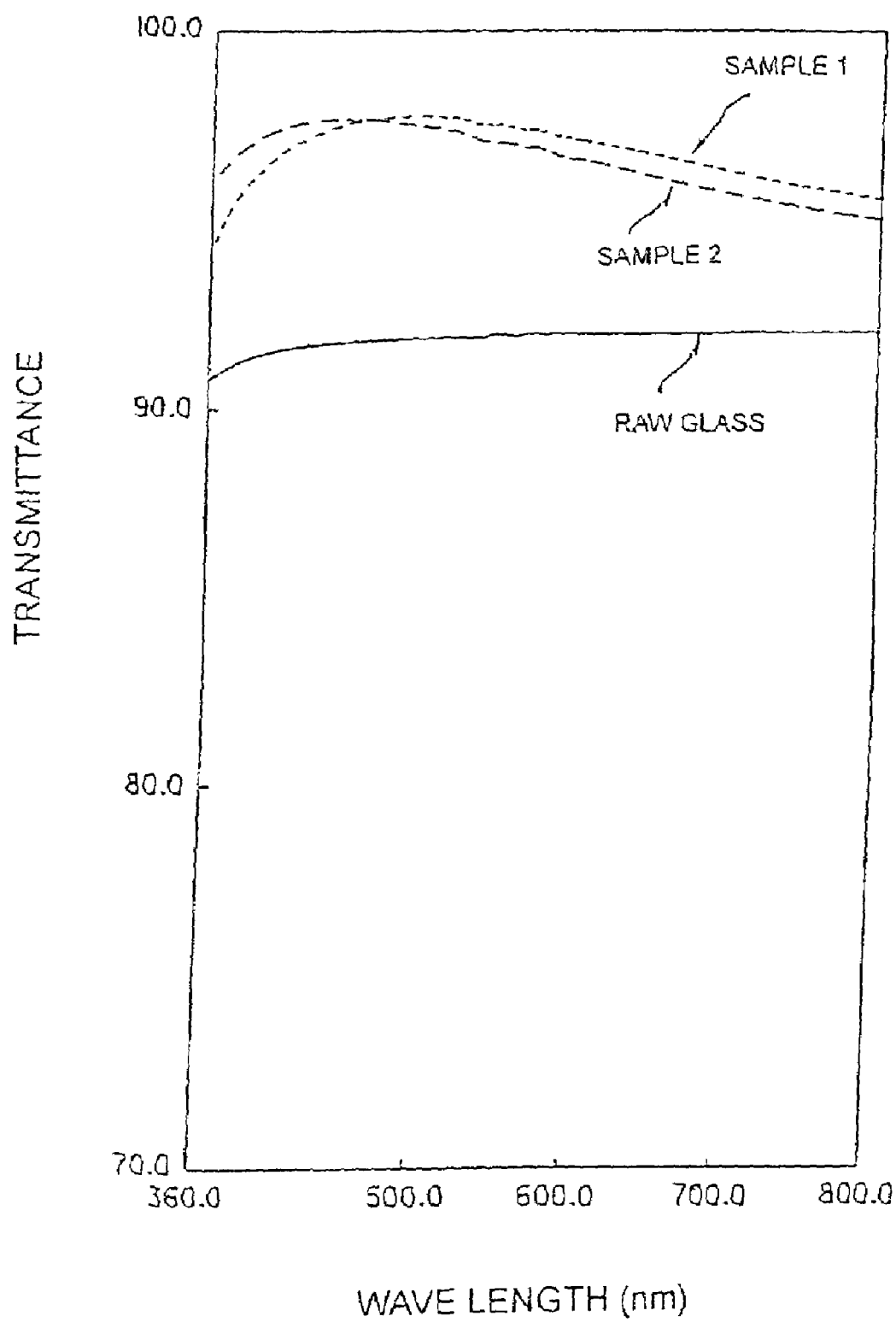
FIG. 3 is a graph that shows the transmittance of each of samples obtained from each of Preferred Embodiments 1 and 2.

FIG. 3 shows transmittance spectrum of each of sample 1 (dotted line), and sample 2 (broken line) together with the spectrum of raw glass (solid line) as a reference. It is clear that the transmittance loss due to reflection is reduced, indicating that the function as an antireflection film is obtained.

Characteristics of Sample 3 and Sample 4

Figure 4:
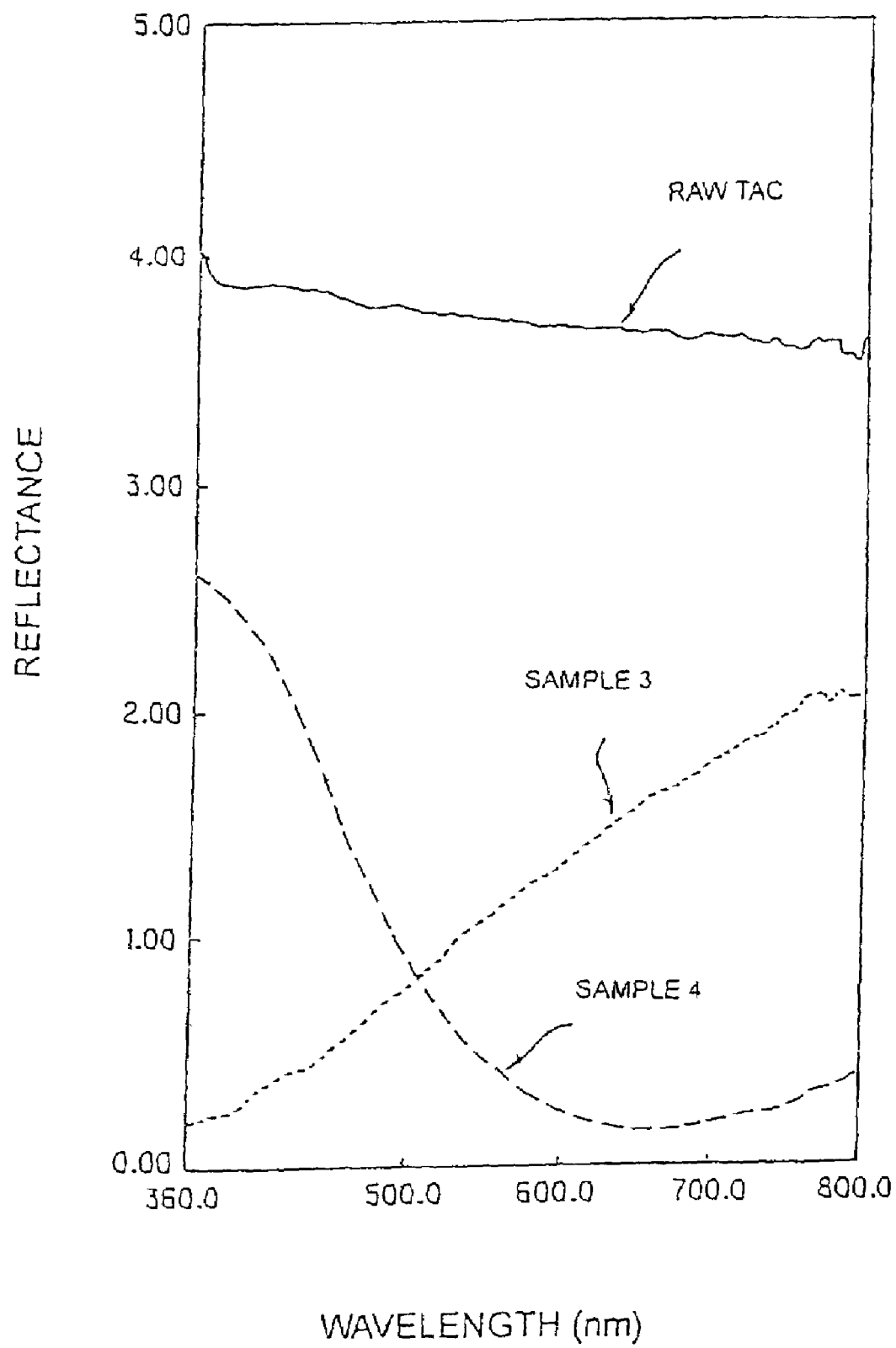
FIG. 4 is a graph that shows the reflectance (incident angle 5°) of each of samples obtained by Preferred Embodiments 3 and 4.

FIG. 4 shows the right reflection spectrum with an incident angle of 5° of each of samples 3, 4 and sample of raw TAC film on one face of which a black tape is bonded. Sample 3 is represented by a dotted line, sample 4 is represented by a broken line, and reference (raw TAC) is represented by a solid line. In comparison with the reference, each of sample 3 and sample 4 has a low reflectance, indicating that the function as an antireflection is obtained.

Characteristics of Samples 5 to 8

Figure 5:
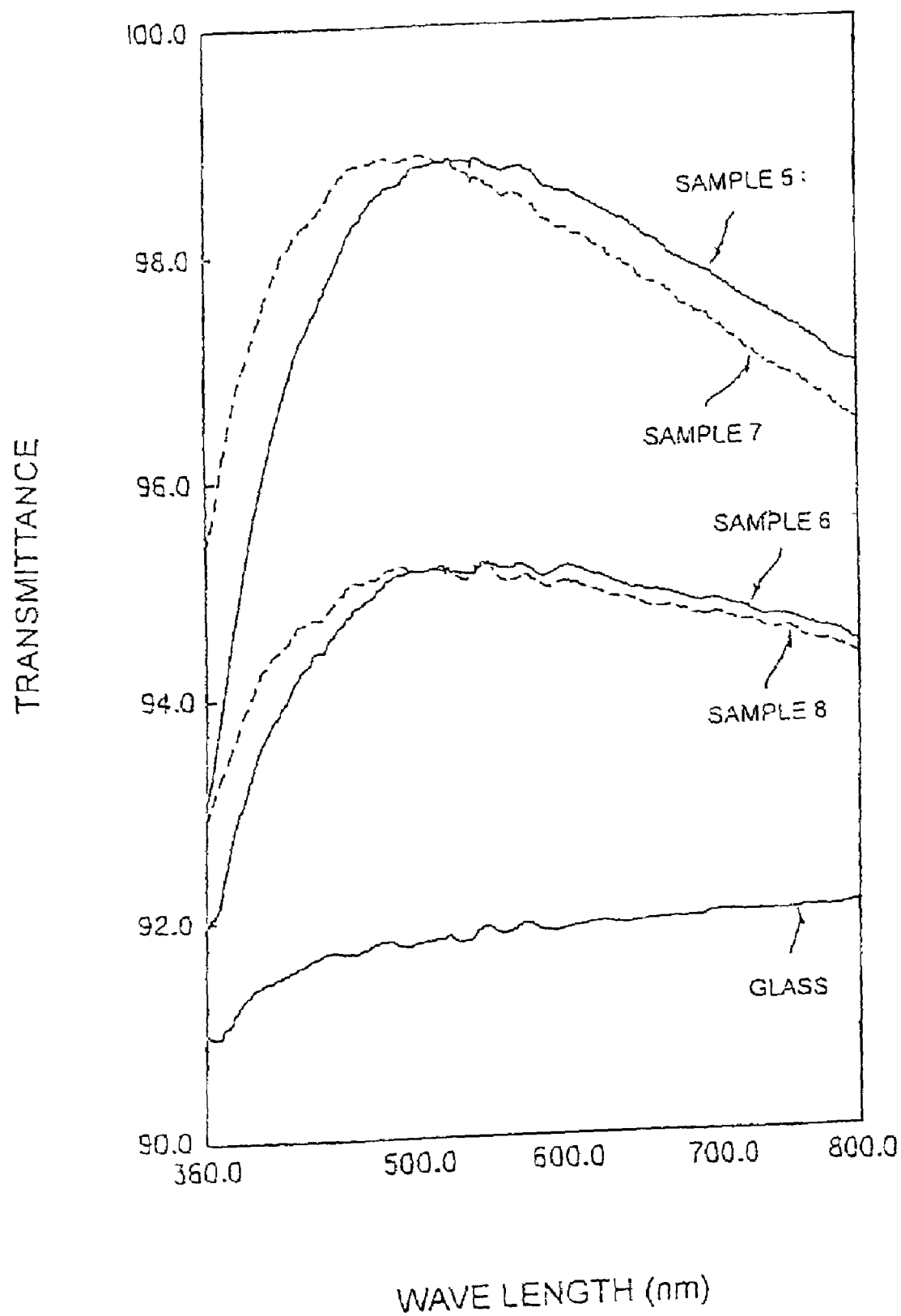
FIG. 5 is a graph that shows the transmittance of each of samples obtained from Preferred Embodiments 5 and 6.
Figure 6:
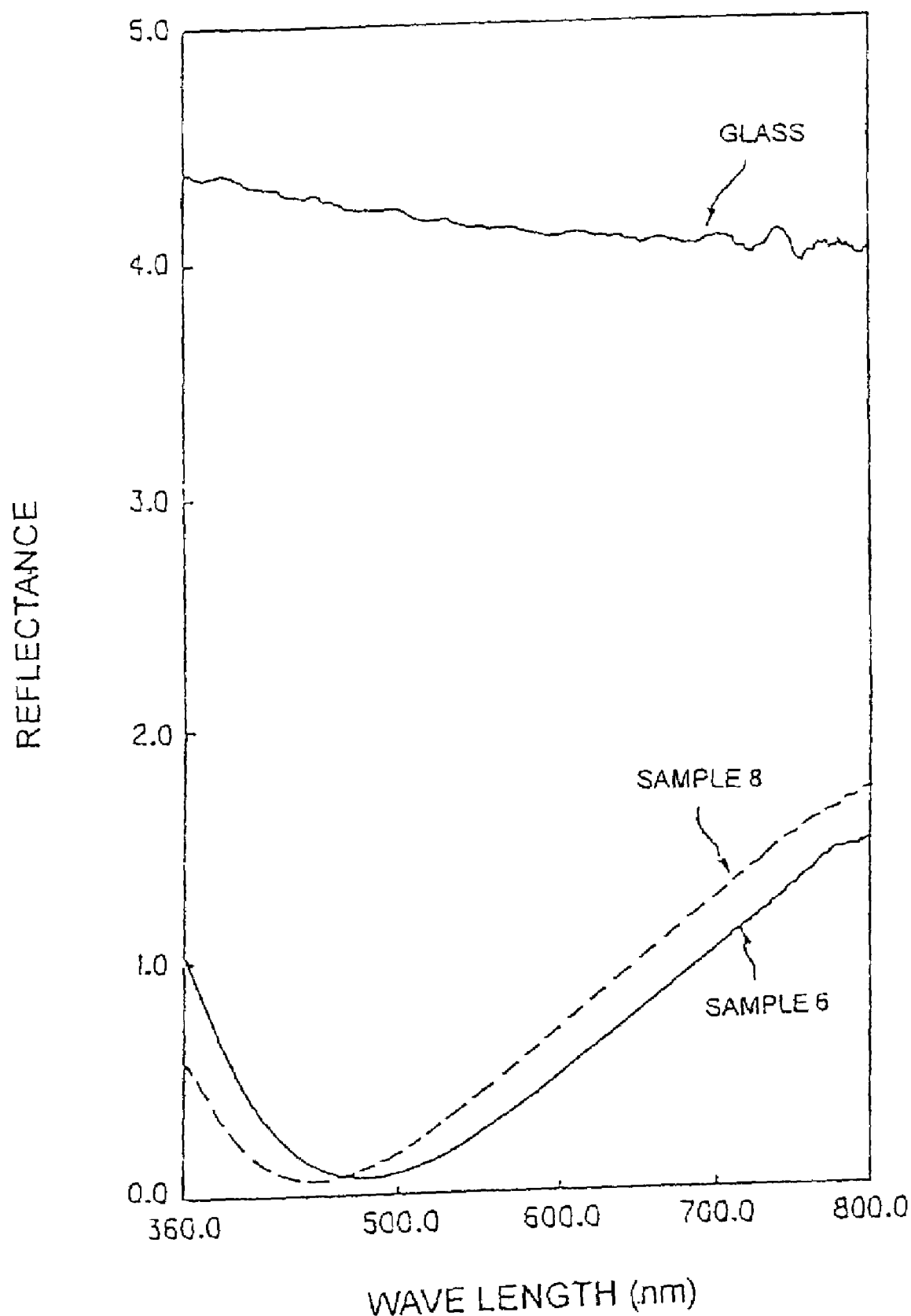
FIG. 6 is a graph that shows the reflectance (incident angle 5°) of each of samples obtained by Preferred Embodiments 5 and 6.

FIG. 5 shows the transmittance spectrum of each of samples 5 to 8, and FIG. 6 shows the reflectance spectrum of each of samples 6 and 8 together with the spectrum of glass as a reference. These data show that a film having a high antireflection property has been formed.

Figure 7A:
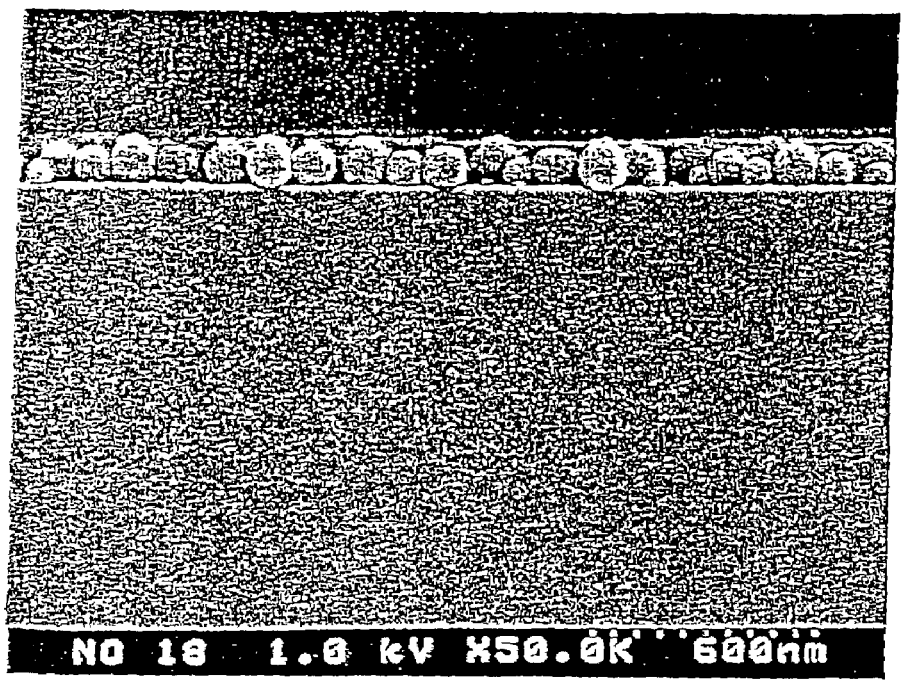
FIGS. 7(a) and 7(b) are photographs from a scanning type electronic microscope showing a plan view and a cross-sectional view of a sample obtained in Preferred Embodiment 5.
Figure 7B:
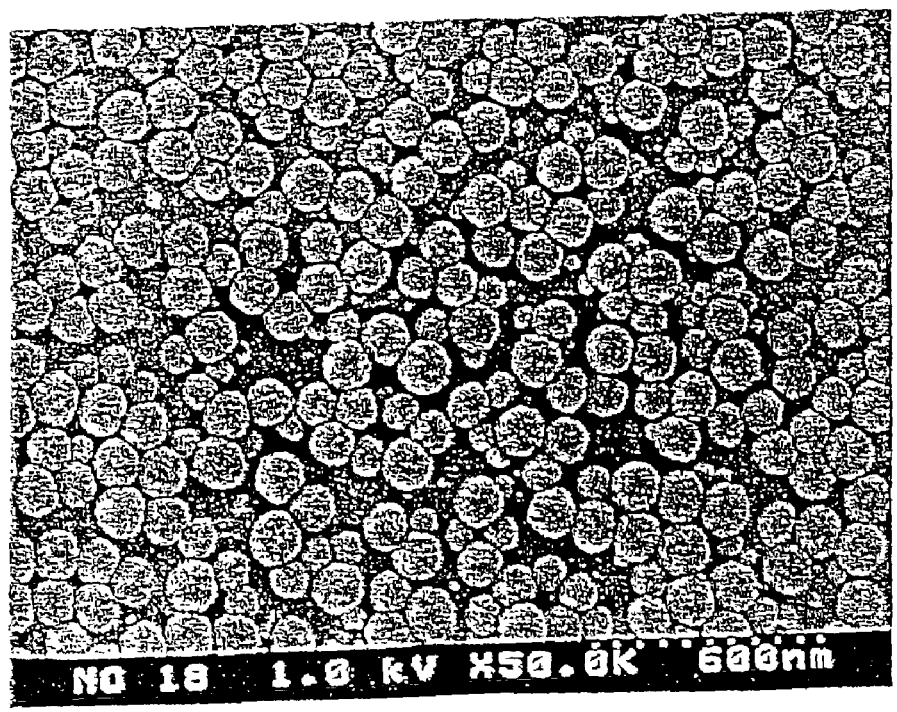
Figure 9A:
FIGS. 9(a) and 9(b) are photographs from a scanning type electronic microscope showing a plan view and a cross-sectional view of a sample prior to a heating process obtained in Preferred Embodiment 7.
Figure 9B:
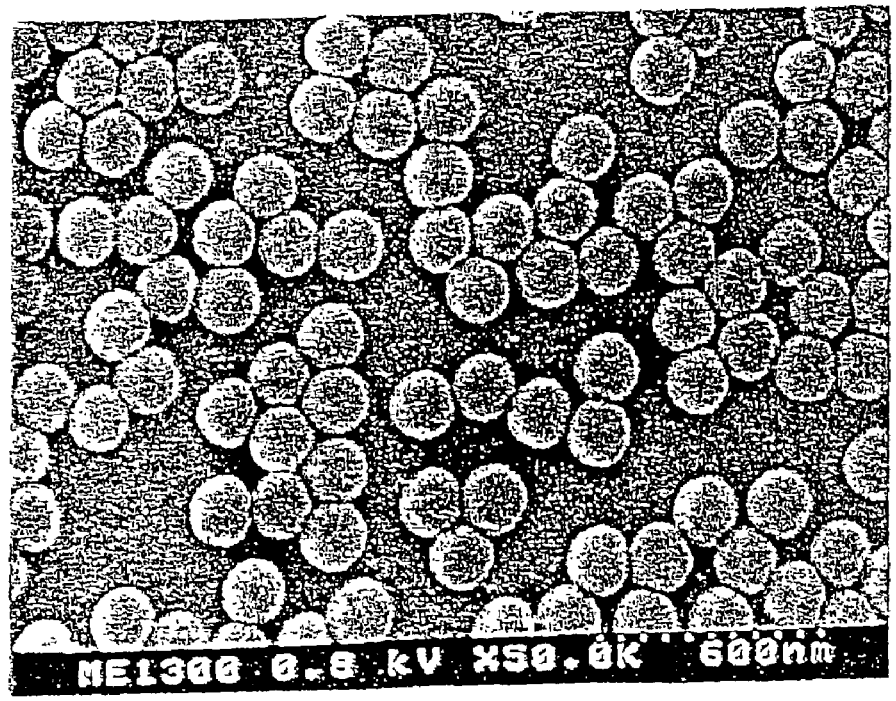
Figure 10A:
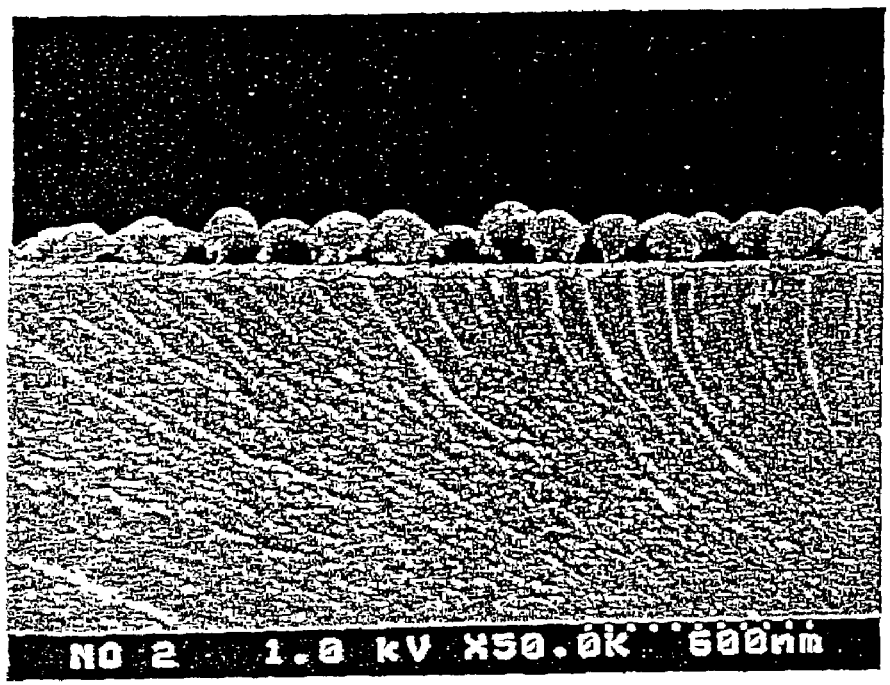
FIGS. 10(a) and 10 (b) are photographs from a scanning type electronic microscope showing a plan view and a cross-sectional view of a sample after a heating process obtained in Preferred Embodiment 7.
Figure 10B:
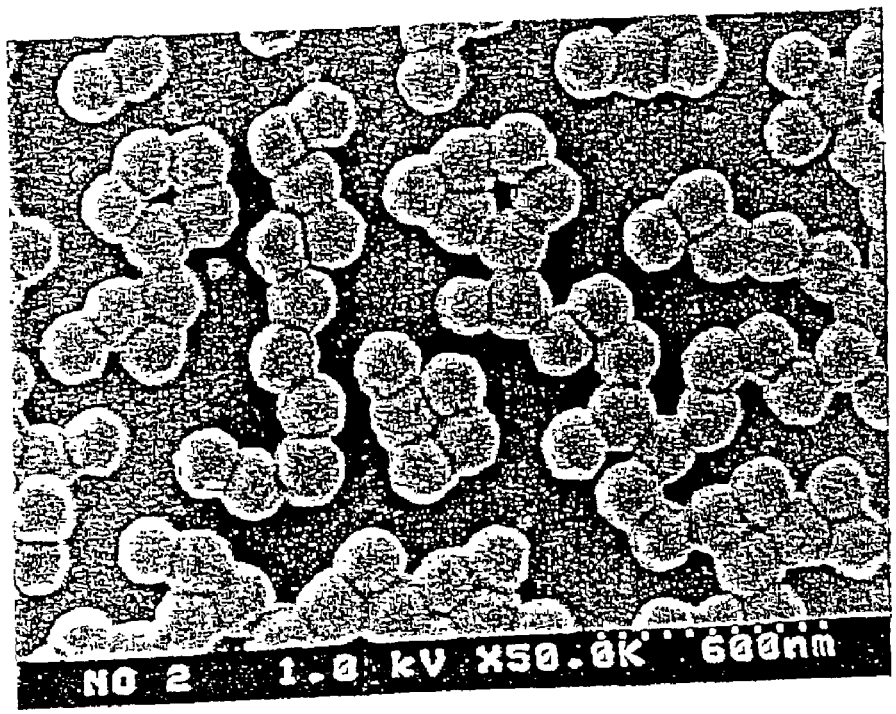

FIGS. 7(a) and 7(b) show a cross-sectional view and a surface of a film of Embodiment 5 as photographs taken by a scanning-type electronic microscope (SEM).

Characteristics of Sample 9

FIG. 8 shows the reflection spectrum of sample 9 together with the reflection spectrum of a reference glass substrate. The result shows that the wavelength exhibiting the lowest reflectance can be controlled by the thermal process conditions. It is estimated that this results from the effects of the particle deformation. Moreover, the thermal process makes it possible to improve the adhesive property of the particles to the substrate.

FIGS. 9(a), 9(b) and FIGS. 10(a), 10(b) show SEM photographs of sample 9 taken before the thermal process and after the thermal process that was carried out at 75° C. for 100 seconds.

Characteristics of Samples 10 to 12

Figure 11:
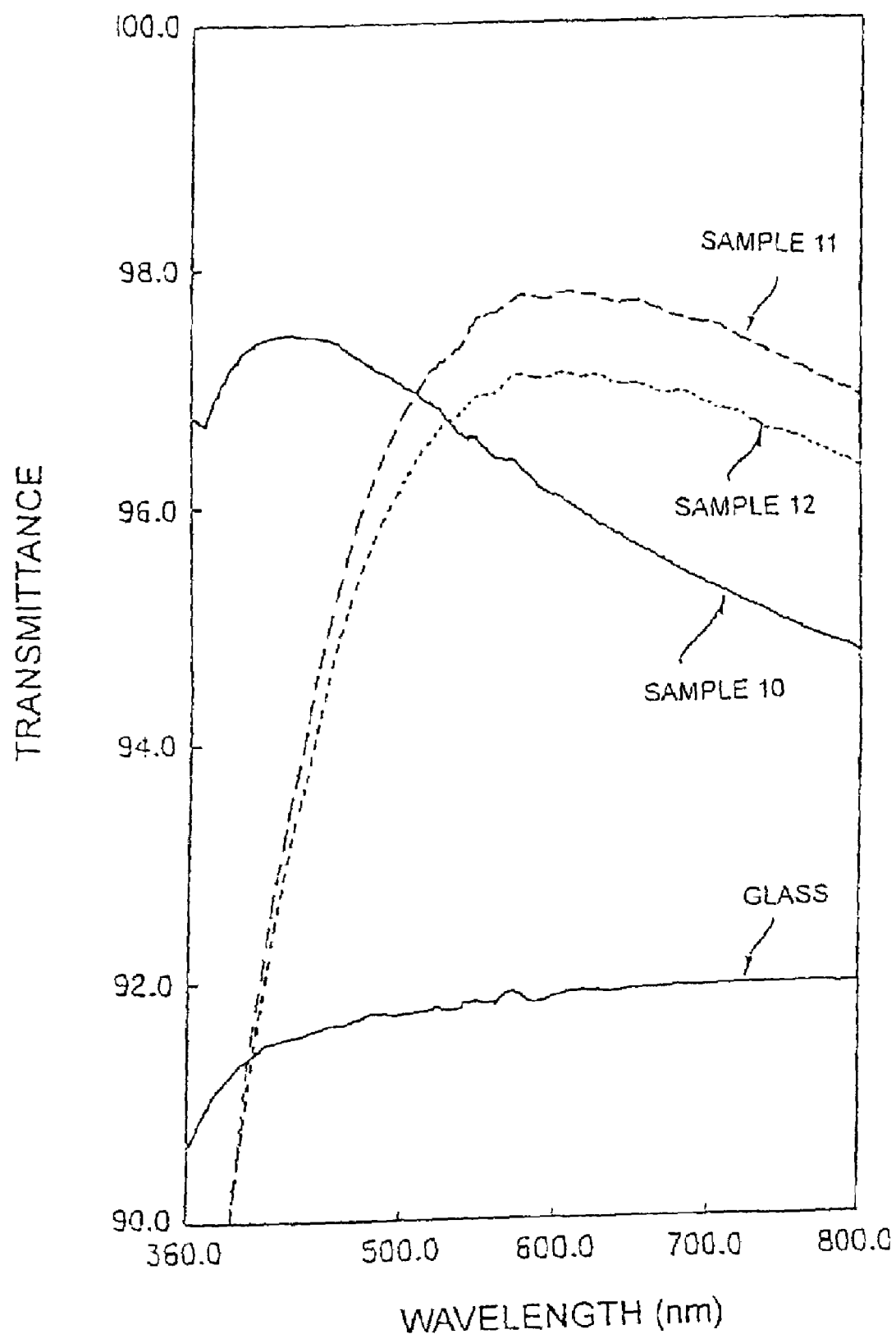
FIG. 11 is a graph that shows the transmittance of each of samples obtained from Preferred Embodiments 8 to 10.

FIG. 11 shows transmission spectrum. Solid line shows sample 10, broken line shows sample 11, and dotted line shows sample 12.

Characteristics of Samples 13 and 14

Figure 12:
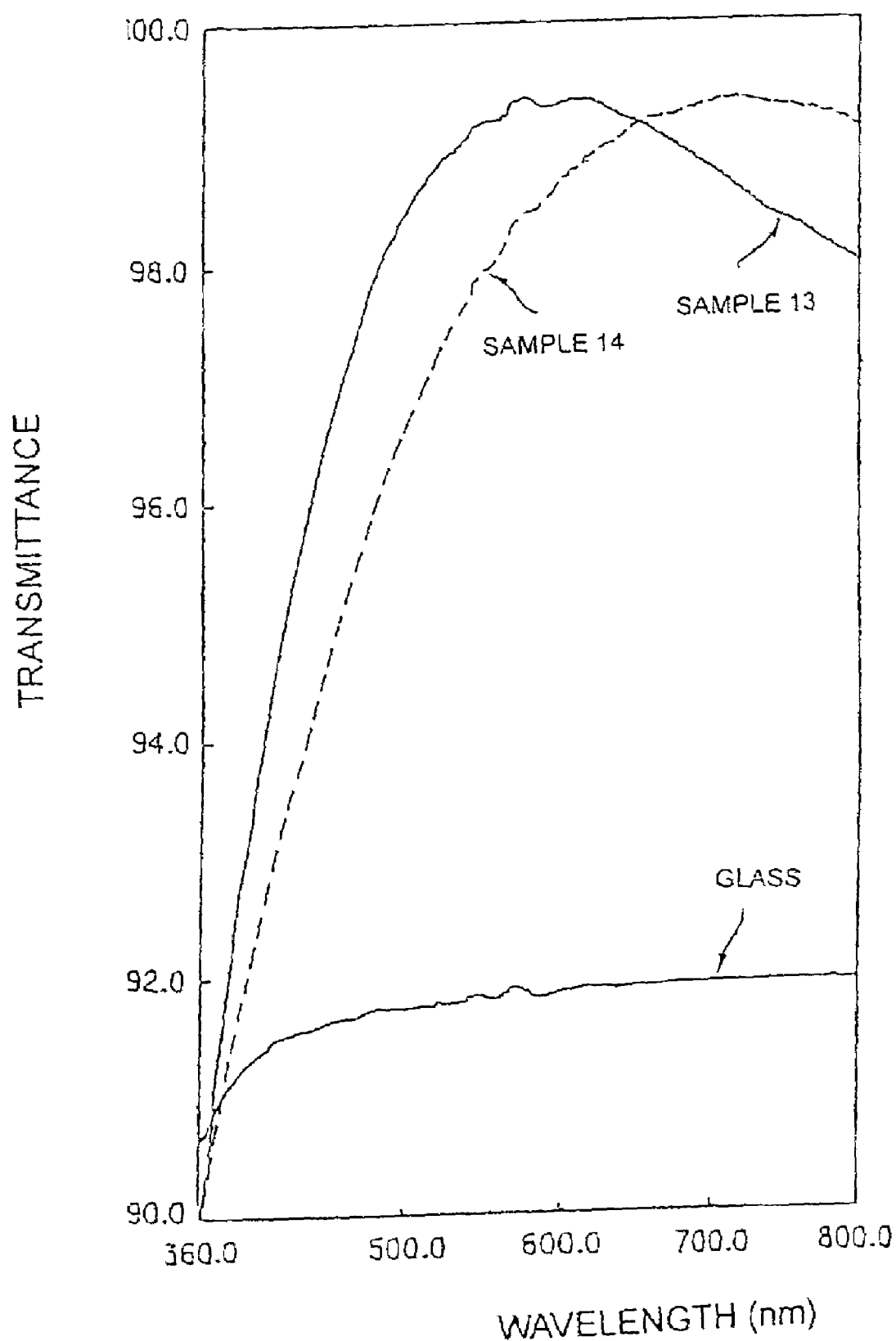
FIG. 12 is a graph that shows the transmittance of each of samples obtained from Preferred Embodiments 11 and 12.

FIG. 12 shows transmission spectrum. Solid line shows sample 13, and broken line shows sample 14.

Control of the Optimal Antireflection Waveform by a Two-Layered Product)

Figure 13:
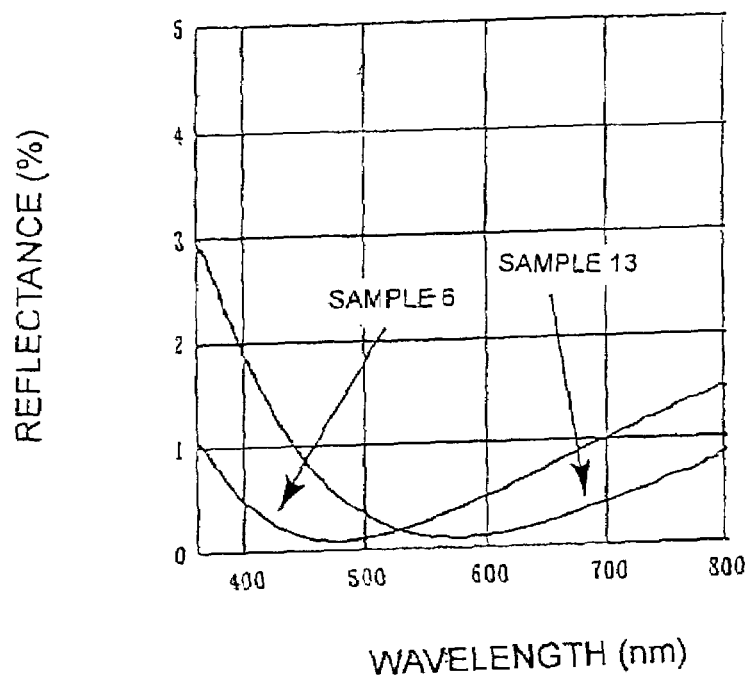
FIG. 13 is a graph that shows the reflectance of each of samples obtained by Preferred Embodiments 5 and 11.

FIG. 13 shows reflection spectrum. Sample 6 is a single-layered product made of only MP-1040, and sample 13 is a two-layered product with Snow Techs 50 and MP-1040. By using the two-layered product, the optimal antireflection wavelength is shifted from approximately 480 nm to approximately 580 nm.

Figure 14:
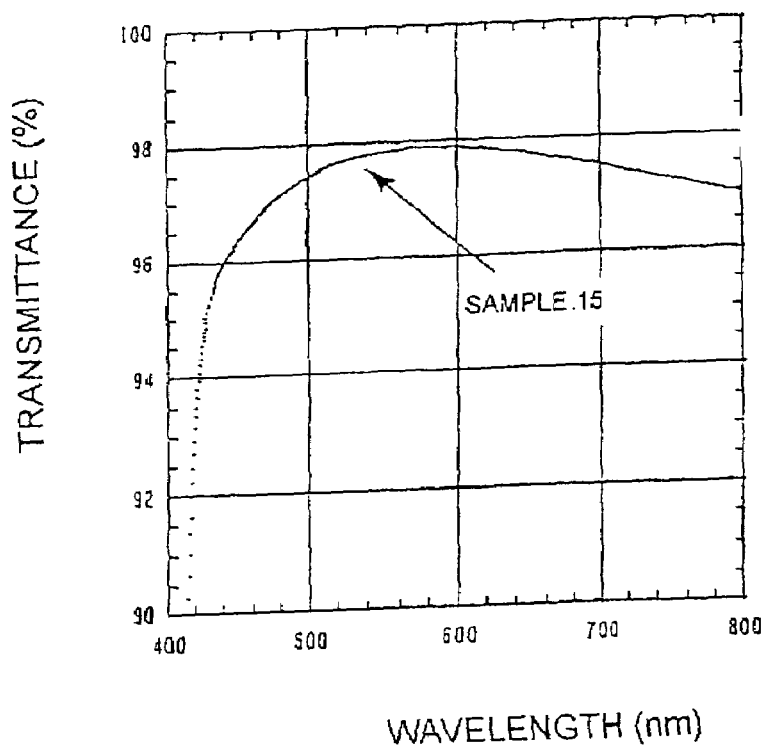
FIG. 14 is a graph that shows the transmittance of a sample obtained from Preferred Embodiment 13.

Spectrum Characteristics of Antireflection Film with a Static-eliminating Property FIG. 14 shows the transmission spectrum of sample 15. As clearly shown by the Figure, in the visible light range, the transmittance exceeds 95%, and the maximum is 97.8%. The transmittance of raw TAC is virtually the same (little less than 92%) as raw glass. Here, the transmittance loss appearing on not more than 420 nm is caused by the absorption due to the additive agent of the applied TAC film.

The invention claimed is:
1. An antireflection film comprising:
a transparent substrate,
a polymer electrolyte film made of a polymer electrolyte, provided as a multi-layered film that is made of not less than two kinds of polymer electrolytes and the polarity of the adjacent layers are different from each other, that is formed on the surface of the transparent substrate, and at least one layer of a fine particle layer that is allowed to adhere to the polymer electrolyte film by at least an electrostatic interaction and made from at least a single layer of fine particles, wherein a surface of the transparent substrate and the fine particles are allowed to adhere to each other by at least an electrostatic interaction, which is achieved, through the polymer electrolyte film, by using fine particles having a polarity different from the polarity: anion and cation, that the polymer electrolyte film has, while the bulk of the fine particle layer is set to have a refractive index lower than the refractive index of the transparent substrate, and an average particle size of fine particles used in the fine particle layer is not more than 300 nm.

2. The antireflection film according to claim 1, wherein the polymer electrolyte film is formed as a film made of a cross-linked polymer electrolyte.

3. The antireflection film according to claim 1, wherein, in addition to the adhesion through the electrostatic interaction, the adhesion between the surface of the polymer electrolyte film and the fine particles is further made by a reinforcing adhesive means.

4. The antireflection film according to claim 3, wherein the reinforcing adhesive means is at least one means selected from the group consisting of a means for irreversibly coupling the surface of the polymer electrolyte film and the fine particles chemically, a means for fusing the surface of the polymer electrolyte film and the fine particles and a means for forming a polymer thin film on the surface of the fine particle layer.

5. The antireflection film according to claim 1, wherein the film thickness of the fine particle layer is set in a range of 50 nm to 300 nm.

6. The antireflection film according to claim 1, wherein the particles used for the fine particle layer are at least not less than one kind of fine particles selected from the group consisting of fine particles of polymers and silica fine particles, and the average particle size thereof is set in a range of 50 nm to 300 nm.

7. The antireflection film according to claim 1, wherein the fine particle layer is formed by at least two layers, with the film thickness of one layer being set in a range of 50 nm to 300 nm and the film thickness of the other layer being set in a range of 1 nm to 50 nm.

8. The antireflection film according to claim 1, wherein the volume percentage of the fine particles In the fine particle layer is set in a range of 10 volume % to 90 volume %.

9. The antireflection film according to claim 1, wherein the bulk refractive index of the fine particle layer is set in a range of 1.05 to 1.70.

* * * * *